(12) United States Patent
Shibata

(10) Patent No.: US 11,729,333 B2
(45) Date of Patent: Aug. 15, 2023

(54) APPARATUS, DATA TRANSFER SYSTEM, AND METHOD TO AVOID DELETION OF DATA TO BE TRANSFERRED UNTIL COMPLETION OF ALL PROCESSES RELATED TO DATA TRANSFER

(71) Applicant: Yusuke Shibata, Tokyo (JP)

(72) Inventor: Yusuke Shibata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/448,935

(22) Filed: Sep. 27, 2021

(65) Prior Publication Data
US 2022/0103713 A1    Mar. 31, 2022

(30) Foreign Application Priority Data
Sep. 30, 2020 (JP) .................. 2020-165399

(51) Int. Cl.
*H04N 1/32* (2006.01)
(52) U.S. Cl.
CPC ..... *H04N 1/32374* (2013.01); *H04N 1/32122* (2013.01); *H04N 1/32459* (2013.01)
(58) Field of Classification Search
CPC .......... H04N 1/32374; H04N 1/32122; H04N 1/32459

USPC ............................... 358/1.14, 1.15
See application file for complete search history.

(56) References Cited

U.S. PATENT DOCUMENTS

| | | | |
|---|---|---|---|
| 2001/0034774 A1* | 10/2001 | Watanabe | H04N 1/32776 709/217 |
| 2015/0370519 A1* | 12/2015 | Tachi | G06F 3/1207 358/1.15 |

FOREIGN PATENT DOCUMENTS

| | | |
|---|---|---|
| JP | 2019-041153 | 3/2019 |
| JP | 2021-120845 | 8/2021 |

* cited by examiner

*Primary Examiner* — Kent Yip
(74) *Attorney, Agent, or Firm* — IPUSA, PLLC

(57) ABSTRACT

An apparatus includes a memory, and a processor coupled to the memory and configured to store data in the memory, transmit the data stored in the memory to an information processing system, instruct the information processing system to execute a transfer job that includes a first process for transferring the data and a second process related to the first process, and delete the data from the memory in a case where transfer job execution history information indicates that the first process and the second process are completed. The transfer job execution history information includes a history of execution of the transfer job.

11 Claims, 34 Drawing Sheets

FIG.11

| TRANSMISSION SOURCE NUMBER | SORT DESTINATION FOLDER NAME | NOTIFICATION EMAIL ADDRESS |
|---|---|---|
| 0312345678 | ABC | aaa@aaa.com |
| 0311112222 | DEF | bbb@aaa.com |
| 0987654321 | XXX | ccc@aaa.com |
| ⋮ | ⋮ | ⋮ |

501

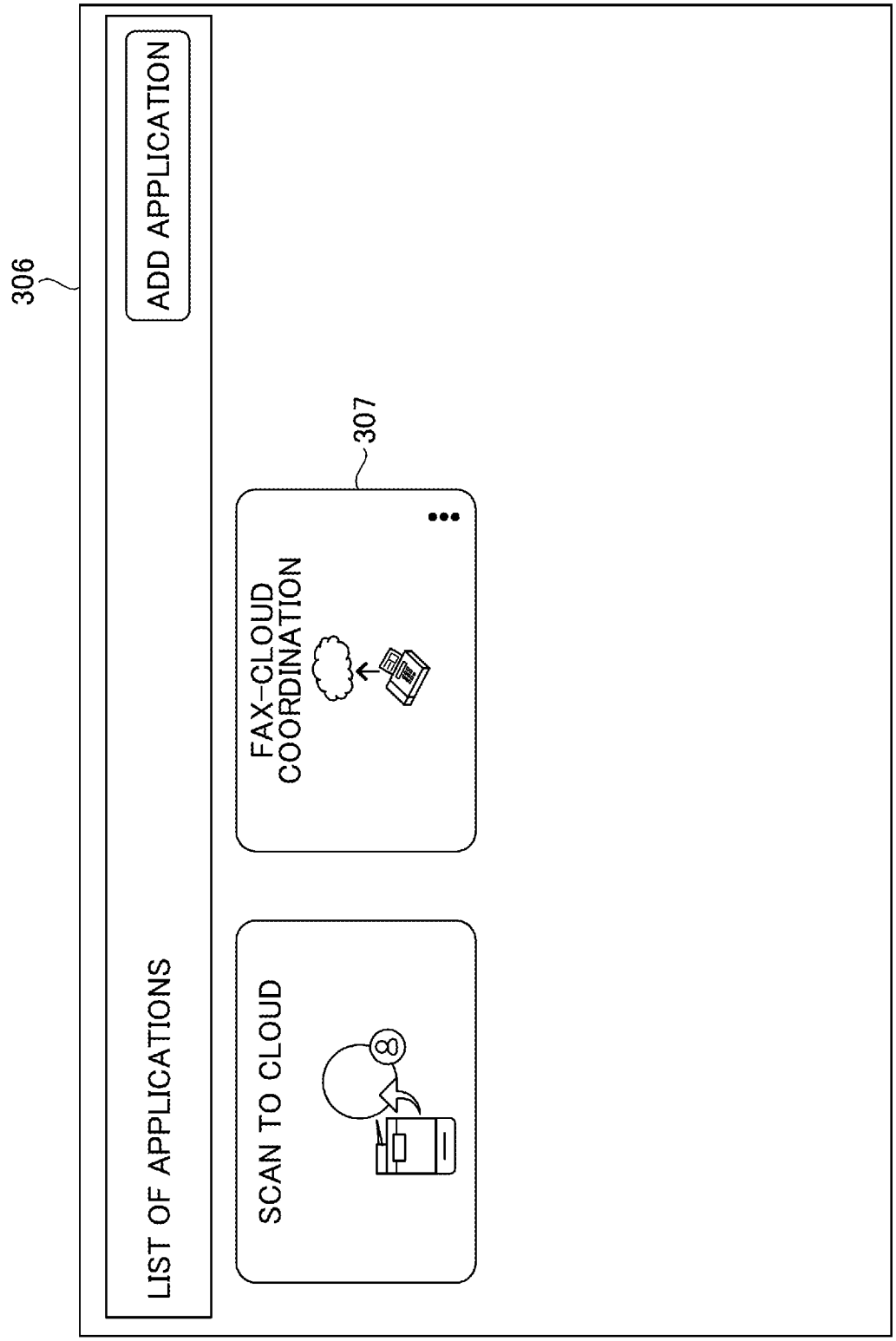

BACK TO TOP/BACK TO APPLICATION MANAGER

FAX-CLOUD COORDINATION

ASTERISK (*) INDICATES REQUIRED FIELD
STORAGE SETTING

| | | |
|---|---|---|
| STORAGE | XXX CLOUD 309 | |
| STORAGE ACCOUNT * | [SELECT ACCOUNT] NO ACCOUNT IS SELECTED 310 | |
| FAX STORAGE FOLDER * | [SELECT FOLDER] NO FOLDER IS SELECTED | |
| SORT SETTING INFORMATION STORAGE FILE * | [SELECT FILE] NO FILE IS SELECTED 311 | |
| UNDEFINED DATA SETTINGS | 312 | |
| UNDEFINED DATA STORAGE FOLDER NAME * | FAX TRAY | |
| UNDEFINED DATA NOTIFICATION EMAIL ADDRESS (IF NOT SPECIFIED, NO NOTIFICATION WILL BE SENT.) | [+] 314 | 313 |
| NOTIFICATION EMAIL ADDRESS IN CASE OF ERROR * | NOTIFICATION EMAIL ADDRESS IN CASE OF ERROR IS NOT ENTERED | |

⊛ AAA ▸

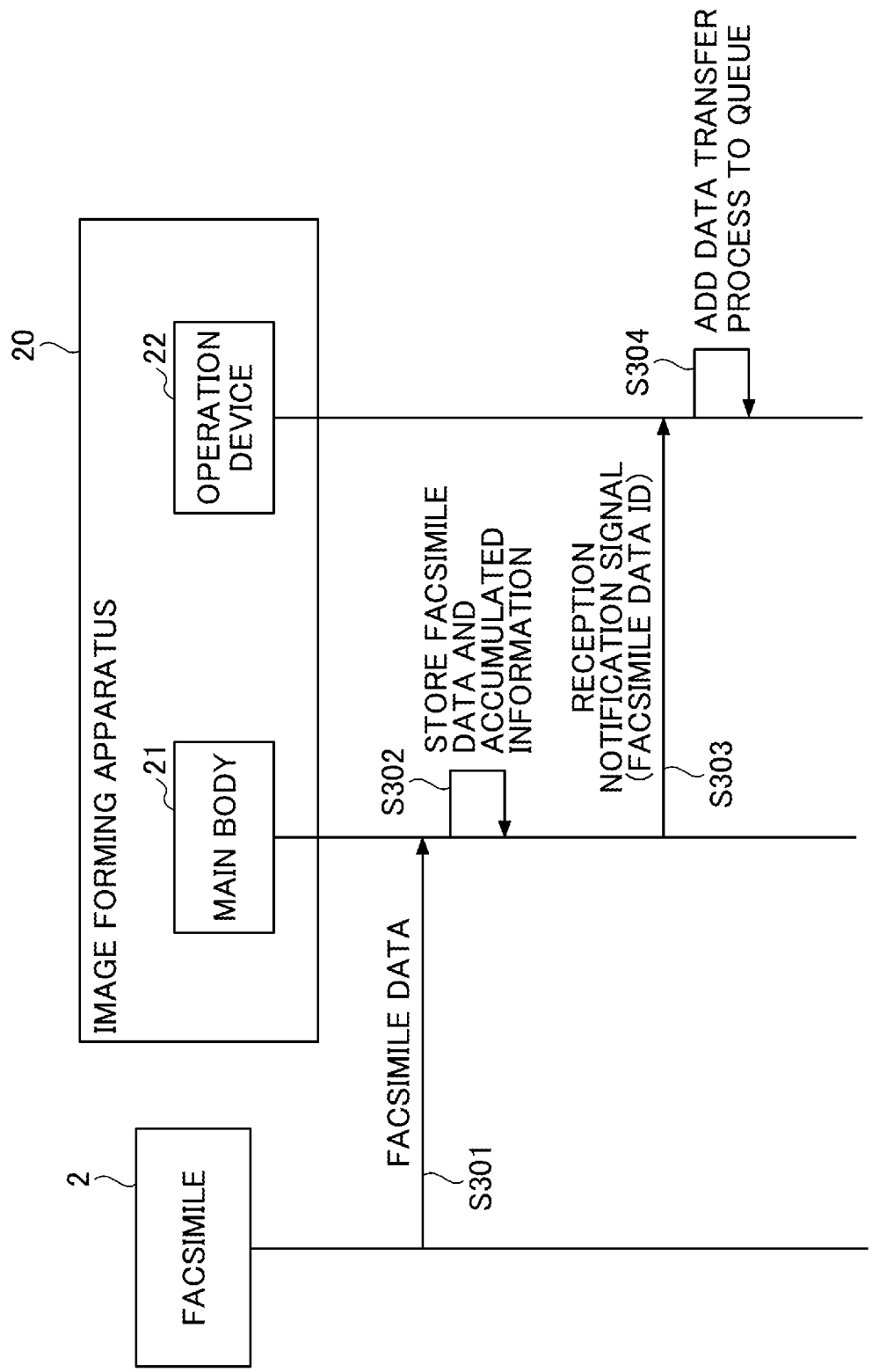

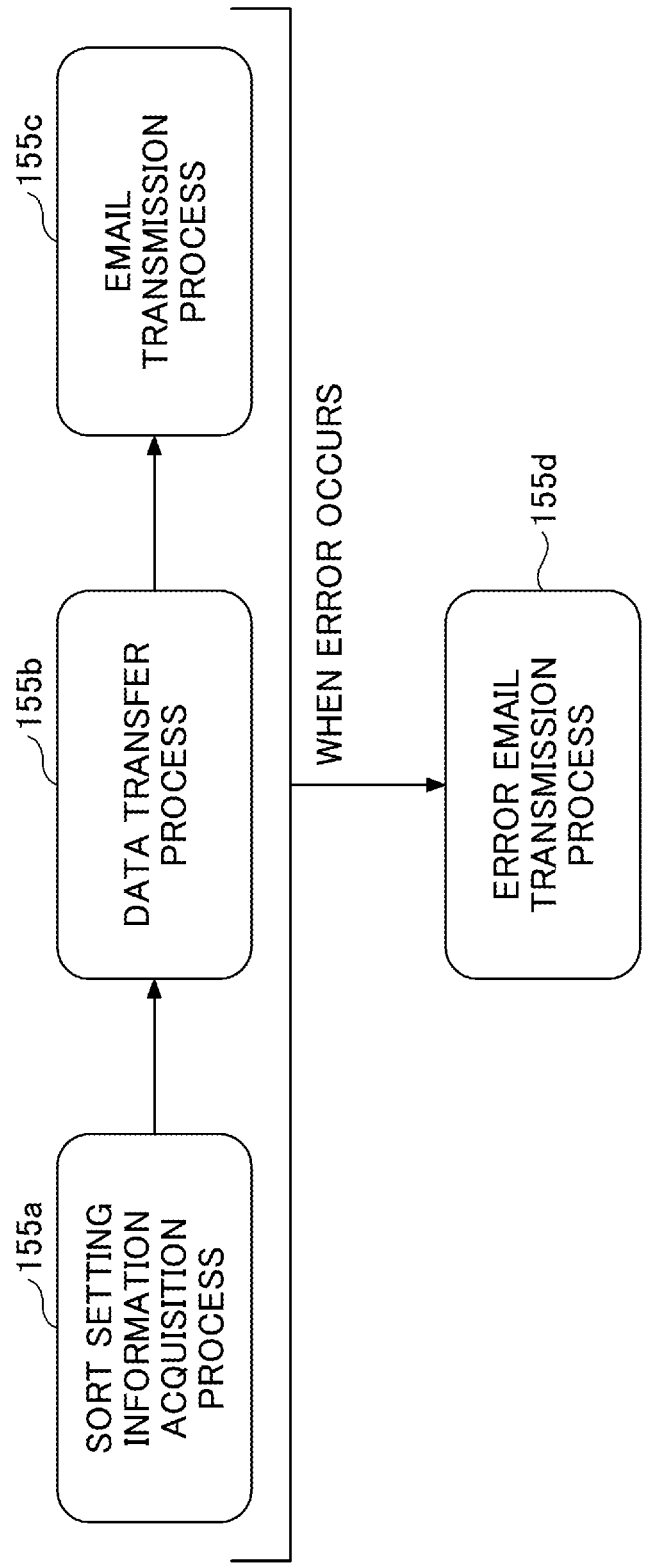

FIG.18

| TRANSFER JOB EXECUTION STATUS | ACCEPTANCE OF JOB | SORT SETTING INFORMATION ACQUISITION PROCESS | DATA TRANSFER PROCESS | EMAIL TRANSMISSION PROCESS | TRANSFER STATUS |
|---|---|---|---|---|---|
| A | ACCEPTED | NOT STARTED | NOT STARTED | NOT STARTED | ACCEPTED |
| B | ACCEPTED | BEING EXECUTED | NOT STARTED | NOT STARTED | PROCESSING |
| C | ACCEPTED | COMPLETED SUCCESSFULLY | BEING EXECUTED | NOT STARTED | PROCESSING |
| D | ACCEPTED | COMPLETED SUCCESSFULLY | COMPLETED SUCCESSFULLY | BEING EXECUTED | PROCESSING |
| E | ACCEPTED | COMPLETED SUCCESSFULLY | COMPLETED SUCCESSFULLY | COMPLETED SUCCESSFULLY | COMPLETED |
| F | ACCEPTED | ACCEPTED | ERROR | NOT STARTED | ERROR |

FIG.20

```
From: no_reply@xxx.com
To: aaa@aaa.com
Cc:
Title: [SMART FAX SORTING]Fax from 0312345678 (No.1234)

FAX SENT TO YOU HAS BEEN RECEIVED. PLEASE CHECK FROM THE FOLLOWING LINK.

ABC_20190213_143342.pdf https://cloudstrageAAA.com/Documents/top/ABC/ABC_20190213_143342.pdf
```

From: no_reply@xxx.com
To: aaa@aaa.com
Cc:
Title: [SMART FAX SORTING]Fax from 0312345678 (No.1234)

FAX SENT TO YOU HAS BEEN RECEIVED. PLEASE CHECK FROM THE FOLLOWING LINK.

―――
0312345678_20190213_143342.pdf https://cloudstrageAAA.com/Documents/top/undefined/0312345678_20190213_143342.pdf

| QUEUE ID | PROCESS | FACSIMILE DATA ID |
|---|---|---|
| Q0001 | DATA TRANSFER PROCESS | 0000001 |
| Q0002 | RETRANSMISSION PROCESS | – |
| Q0003 | DATA TRANSFER PROCESS | 0000002 |
| Q0004 | DATA TRANSFER PROCESS | 0000003 |
| Q0005 | DATA DELETION PROCESS | – |

| JOB ID | MACHINE IDENTIFICATION NUMBER | FACSIMILE DATA ID | TRANSFER STATUS |
|---|---|---|---|
| J0001 | 3A10-115500 | 0000001 | ERROR |
| J0002 | 3A10-115500 | 0000001 | COMPLETED |
| J0003 | 3A10-115500 | 0000002 | COMPLETED |
| J0004 | 3A10-115555 | 0000001 | COMPLETED |
| J0005 | 3A10-115500 | 0000003 | COMPLETED |
| J0006 | 3A10-115500 | 0000004 | COMPLETED |
| J0007 | 3A10-115500 | 0000005 | COMPLETED |
| J0008 | 3A10-115500 | 0000006 | COMPLETED |
| J0009 | 3A10-115500 | 0000007 | COMPLETED |
| J0010 | 3A10-115500 | 0000008 | COMPLETED |
| J0011 | 3A10-115500 | 0000009 | ERROR |
| J0012 | 3A10-115500 | 0000010 | PROCESSING |
| J0013 | 3A10-115500 | 0000011 | PROCESSING |
| J0014 | 3A10-115500 | 0000012 | ERROR |
| J0015 | 3A10-115500 | 0000013 | PROCESSING |
| J0016 | 3A10-115500 | 0000014 | ACCEPTED |
| J0017 | 3A10-115555 | 0000002 | PROCESSING |
| J0018 | 3A10-115588 | 0000001 | ACCEPTED |

| MACHINE IDENTIFICATION NUMBER | FACSIMILE DATA ID | TRANSFER STATUS |
|---|---|---|
| 3A10-115500 | 0000001 | COMPLETED |
| 3A10-115500 | 0000002 | COMPLETED |
| 3A10-115500 | 0000003 | COMPLETED |
| 3A10-115500 | 0000004 | COMPLETED |
| 3A10-115500 | 0000005 | COMPLETED |
| 3A10-115500 | 0000006 | COMPLETED |
| 3A10-115500 | 0000007 | COMPLETED |
| 3A10-115500 | 0000008 | COMPLETED |
| 3A10-115500 | 0000010 | COMPLETED |
| 3A10-115500 | 0000011 | PROCESSING |
| 3A10-115500 | 0000013 | PROCESSING |
| 3A10-115500 | 0000014 | ACCEPTED |

FIG.26

| MACHINE IDENTIFICATION NUMBER | FACSIMILE DATA ID |
|---|---|
| 3A10-115500 | 0000001 |
| 3A10-115500 | 0000002 |
| 3A10-115500 | 0000003 |
| 3A10-115500 | 0000004 |
| 3A10-115500 | 0000005 |
| 3A10-115500 | 0000006 |
| 3A10-115500 | 0000007 |
| 3A10-115500 | 0000008 |
| 3A10-115500 | 0000009 |
| 3A10-115500 | 0000010 |
| 3A10-115500 | 0000011 |
| 3A10-115500 | 0000012 |
| 3A10-115500 | 0000013 |
| 3A10-115500 | 0000014 |
| 3A10-115500 | 0000015 |
| 3A10-115500 | 0000016 |

| MACHINE IDENTIFICATION NUMBER | FACSIMILE DATA ID |
|---|---|
| 3A10-115500 | 0000009 |
| 3A10-115500 | 0000012 |
| 3A10-115500 | 0000015 |
| 3A10-115500 | 0000016 |

| MACHINE IDENTIFICATION NUMBER | FACSIMILE DATA ID |
|---|---|
| 3A10-115500 | 0000009 |
| 3A10-115500 | 0000012 |
| 3A10-115500 | 0000014 |
| 3A10-115500 | 0000015 |
| 3A10-115500 | 0000016 |

510

APPARATUS, DATA TRANSFER SYSTEM, AND METHOD TO AVOID DELETION OF DATA TO BE TRANSFERRED UNTIL COMPLETION OF ALL PROCESSES RELATED TO DATA TRANSFER

CROSS-REFERENCE TO RELATED APPLICATIONS

The present application claims priority under 35 U.S.C. § 119 to Japanese Patent Application No. 2020-165399, filed on Sep. 30, 2020, the entire contents of which are incorporated herein by reference.

BACKGROUND OF THE INVENTION

1. Field of the Invention

The disclosures herein relate to an apparatus, a data transfer system, and a data deletion method.

2. Description of the Related Art

In the related art, there is known a technique for sorting received image data into predetermined sorting destinations before transferring the image data. For example, an information processing apparatus including a controller is disclosed. The controller is configured to store data in a storage location associated with facsimile identification information assigned to a transmission source to perform facsimile communication.

There is a need to accumulate received data in an apparatus, and delete the accumulated data when data transfer is successfully completed and no thus longer needed. However, if data is deleted simply based on whether data transfer is successfully completed, the data may be deleted even though another process related to the data transfer has failed, and this may cause problems.

For example, after data transfer is successfully completed, a process for notifying the user of the completion of the data transfer may be performed. However, even if the data transfer is successfully completed, there may be a case where a subsequent notification process may fail. In such a case, the data has been deleted without the user knowing the outcome of the data transfer is performed. Therefore, because the user is not notified of the data transfer, the user's expectation that the data remains available at the apparatus cannot be met.

RELATED-ART DOCUMENTS

Patent Documents

Patent Document 1: Japanese Unexamined Patent Application Publication No. 2019-041153

SUMMARY OF THE INVENTION

According to at least one embodiment, an apparatus includes a memory, and a processor coupled to the memory and configured to store data in the memory, transmit the data stored in the memory to an information processing system, instruct the information processing system to execute a transfer job that includes a first process for transferring the data and a second process related to the first process, and delete the data from the memory in a case where transfer job execution history information indicates that the first process and the second process are completed. The transfer job execution history information includes a history of execution of the transfer job.

BRIEF DESCRIPTION OF THE DRAWINGS

Other objects and further features of the present invention will be apparent from the following detailed description when read in conjunction with the accompanying drawings, in which:

FIG. 11 is a diagram illustrating an example of sort setting information;

FIG. 12 is a diagram illustrating an example functions list screen;

FIG. 13 is a diagram illustrating an example data transfer function setting screen;

FIG. 14 is a diagram illustrating an example sequence of a data reception process;

FIG. 17 is a diagram illustrating an example of transfer job definition information;

FIG. 18 is a diagram illustrating a transfer status;

FIG. 20 is a first diagram illustrating an example notification email;

FIG. 21 is a second diagram illustrating an example notification email;

FIG. 22 is a diagram illustrating an example of queue information;

FIG. 24 is a diagram illustrating and example of transfer job execution history information;

FIG. 26 is a diagram illustrating an example of information indicating data within a transmission time period;

FIG. 27 is a diagram illustrating an example of information indicating data to be retransmitted;

FIG. 33 is a diagram illustrating an example of information indicating data to be deleted.

DESCRIPTION OF THE EMBODIMENTS

According to at least one embodiment, data can be deleted at an appropriate timing.

In the following, a data transfer system according to an embodiment will be described with reference to the drawings.

Figure 1:
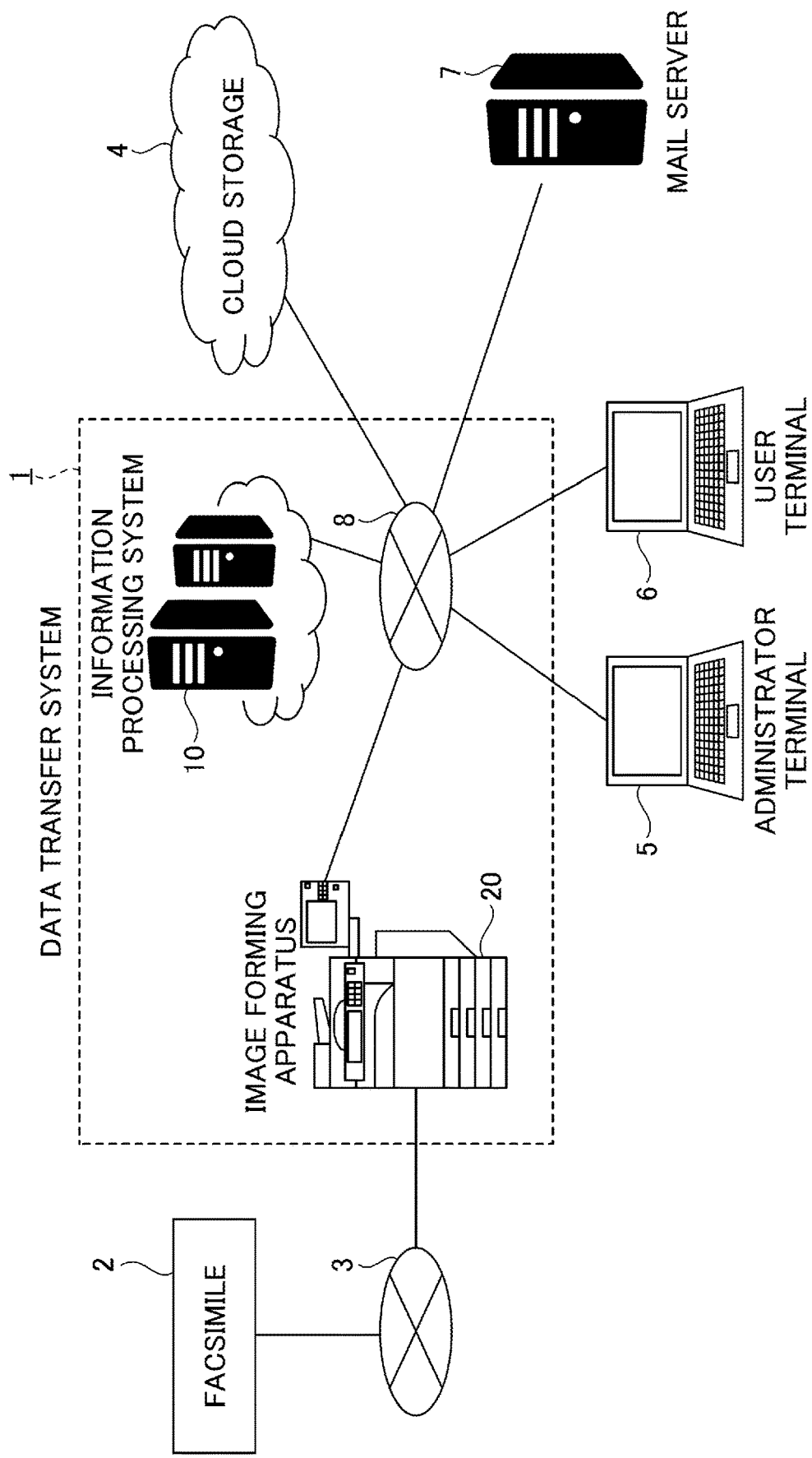
FIG. 1 is a diagram illustrating an example system configuration of a data transfer system.

FIG. 1 is a diagram illustrating an example system configuration of the data transfer system.

A data transfer system 1 according to the present embodiment includes an information processing system 10 and an image forming apparatus 20.

The information processing system 10 is communicably connected to one or more image forming apparatuses 20 and to an apparatus such as a terminal via a network 8. The information processing system 10 has a fundamental function, for example, an external coordination function for coordinating with external services such as user authentication, device authentication, tenant information management, device information management, user information management, screen information management, file management, and cloud storage. The information processing system 10 also has various functions including an application program interface (API) for executing each function in response to receiving a request from an apparatus, and functions as a web service providing system that provides each function to the image forming apparatus 20 or an apparatus such as a terminal.

The information processing system 10 is constructed as, for example, a platform for providing cloud services of various functions. The information processing system 10 is configured by a plurality of information processing apparatuses, and the plurality of information processing apparatuses process the functions described above in coordination with each other in a distributed manner. However, a single information processing apparatus may implement all of the functions. In the following description, the information processing system 10 performs processes of the respective functions. However, an information processing apparatus included in the information processing system 10 actually performs the processes.

Further, the information processing system 10 performs, as the cloud services described above, processes specified in various web application programs (hereinafter referred to as web applications). Each web application is an application program specifying a function provided by the information processing system 10 serving as a web server to the image forming apparatus 20, which is a web client. Further, the information processing system 10 determines, for each web application, if any, whether each user or each apparatus is authorized to use the web application.

Further, the information processing system 10 includes workflow applications as web applications. The workflow applications are web applications for executing workflows specifying the flow of processes composed of units called components. One of the workflow applications is a data transfer application for transferring received data to a designated storage area, for example, a data transfer application for transferring facsimile data.

The information processing system 10 performs a process specified in the data transfer application to transfer facsimile data received from the image forming apparatus 20 to a cloud storage 4 via the network 8, which will be described later. At this time, the information processing system 10 sorts facsimile data into a predetermined folder in the cloud storage 4 in accordance with set information, and stores the facsimile data in the folder. Then, the information processing system 10 transmits a notification email to a notification email address, which is set in accordance with the sort destination, via a mail server 7. The number of cloud storages 4 is not limited to one, and data may be transferred to a plurality of cloud storages 4. A single data transfer application may be used to designate storage areas (storage locations) of a plurality of cloud storages 4 as sort destinations. Each data transfer application may be assigned a different cloud storage 4 as a sort destination.

The image forming apparatus 20 is an apparatus that implements image forming functions such as scanning, printing, copying, and facsimile transmission (faxing). The image forming apparatus 20 not only implements image forming functions alone but also functions as a web client that utilizes various functions provided by the information processing system 10. A device or an apparatus that transmits data to the information processing system 10 is not limited to an image forming apparatus, and data can be transmitted from various data transmission apparatuses to the information processing system 10.

The image forming apparatus 20 receives facsimile data from a facsimile 2 via a telephone network 3. The image forming apparatus 20 prints (forms an image of) the received facsimile data, stores the facsimile data in a storage area in the image forming apparatus 20, and transmits the stored facsimile data to the information processing system 10 via the network 8. The image forming apparatus 20 further includes, as a device application, a transmission application for transmitting the facsimile data to the information processing system 10. The apparatus that receives information, such as the image forming apparatus 20, may be any apparatus that receives data from various data transmission apparatuses other than the facsimile 2.

The network 8 is an example of a communication network and mainly refers to the Internet. However, the network 8 may be a wireless communication network or a wired communication network. Further, the network 8 is not limited to the Internet, and may be a local area network (LAN), a wide area network (WAN), a virtual private network (VPN), or the like. The telephone network 3 is also an example of a communication network and mainly refers to a facsimile (fax) line or the Internet. However, the telephone network 3 may be any other Device identification information indicating one or more image forming apparatuses 20 and user identification information indicating a user or users who use the image forming apparatus or apparatuses 20 are managed by the tenant information management function of the information processing system 10 such that the device identification information and the user identification information belong to one tenant. The term "tenant" refers to a group or an organization to which a user belongs, such as a company, and tenant identification information identifying one tenant, and user identification information and device identification information belonging to the tenant are stored in the information processing apparatus of the information processing system 10 in association with each other. The information processing system 10 performs processes in coordination with a plurality of image forming apparatuses 20 belonging to a plurality of tenants.

The cloud storage 4 is a storage area that can be used by a person on the web. The cloud storage 4 provides a storage area having a capacity specified by a contract for each account to the user of the account. For example, a tenant administrator of a certain tenant who uses a cloud service provided by the information processing system 10 can use the storage area for the account (tenant account) in the cloud storage 4 for which the tenant administrator has made a contract to apply for use, as the storage area for an apparatus that operates in cooperation with the information processing system 10 (reference destination or transfer destination of information).

The facsimile data transferred from the information processing system 10 is stored in the storage area for the account in the cloud storage 4, which is used by the tenant to which the image forming apparatus 20 as the transfer source of the facsimile data belongs.

An administrator terminal 5 is a terminal used by the tenant administrator. In response to an operation by the tenant administrator, the administrator terminal 5 transmits input setting information for each web application to the information processing system 10. For example, the administrator terminal 5 transmits information referred to by the data transfer application, such as a storage area in the cloud storage 4 serving as a reference destination (storage location) of sort setting information specifying a method for sorting the facsimile data, and account information of the cloud storage 4 used for reference, to the information processing system 10, and sets the information in the data transfer application.

The tenant administrator uses the web browser of the administrator terminal 5 to access a web application (a data transfer application or an administrator setting web page of the application) of the information processing system 10, a management site of the tenant to which the tenant administrator belongs, the cloud storage 4, and the like, and performs display and input operations on the web browser. The tenant administrator may use dedicated software other than the web browser. In the management site of the tenant to which the tenant administrator belongs, which is accessed from the administrator terminal 5, settings for the administrator, such as registration of a device (an apparatus) to the tenant to which the tenant administrator belongs, assignment and cancelation of a device license to a device (an apparatus), and assignment or cancelation of a user license to a tenant-registered user, can be set.

Further, in response to an operation by the tenant administrator, the administrator terminal 5 transmits sort setting information (such as a file in a tabular format) indicating the settings for the sort destination of the facsimile data, which is referred to by the data transfer application, to the cloud storage 4 and stores the sort setting information in the cloud storage 4.

A user terminal 6 is a terminal used by the user of the image forming apparatus 20. In response to an operation by the user, the user terminal 6 acquires, from the cloud storage 4, the facsimile data already transferred from the information processing system 10, and displays the facsimile data. Further, the user terminal 6 receives a notification email transmitted from the information processing system 10 via the mail server 7. The user uses the web browser of the user terminal 6 to access the web application of the information processing system 10, the cloud storage 4, and the like, and performs display and input operations on the web browser. The user may use dedicated software other than the web browser.

Next, a hardware configuration of each of the apparatuses included in the data transfer system 1 according to the present embodiment will be described.

Figure 2:
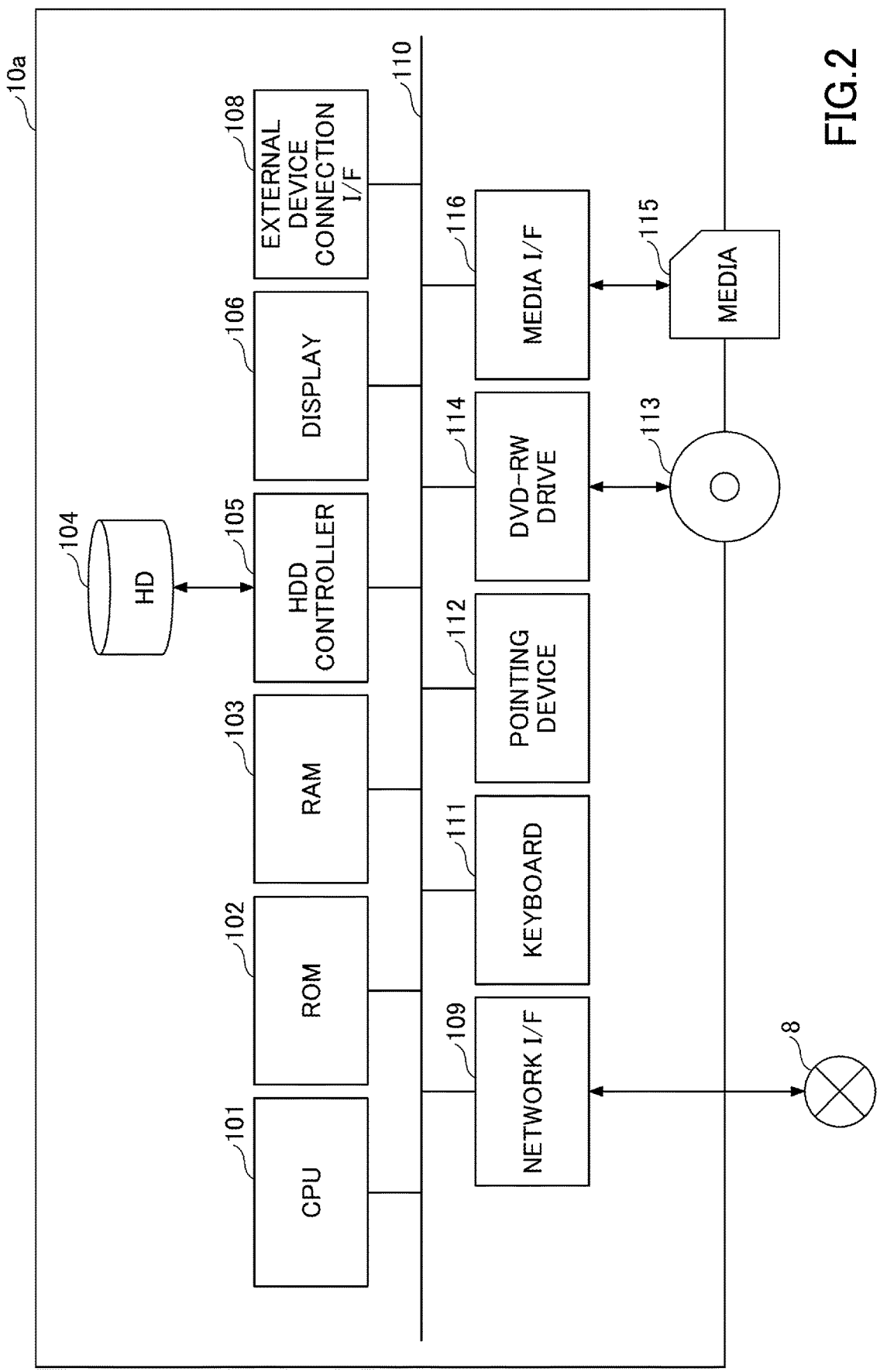
FIG. 2 is a diagram illustrating an example hardware configuration of an information processing apparatus.

FIG. 2 is a diagram illustrating an example hardware configuration of an information processing apparatus.

The information processing system 10 includes one or more information processing apparatuses. An information processing apparatus 10a included in the information processing system 10 is configured by a computer, and includes a central processing unit (CPU) 101, a read only memory (ROM) 102, a random access memory (RAM) 103, a hard disk (HD) 104, a hard disk drive (HDD) controller 105, a display 106, an external device connection interface (I/F) 108, a network I/F 109, a bus line 110, a keyboard 111, a pointing device 112, a digital versatile disk rewritable (DVD-RW) drive 114, and a media I/F 116.

The CPU 101 controls the overall operation of the information processing apparatus 10a. The ROM 102 stores a program used to drive the CPU 101, such as an initial program loader (IPL). The RAM 103 is used as a work area for the CPU 101. The HD 104 stores a program such as a guest network creation application and various other data. The HDD controller 105 controls reading or writing of various data from or to the HD 104 under the control of the CPU 101. The display 106 displays various kinds of information such as a cursor, a menu, a window, characters, and an image.

The external device connection I/F 108 is an interface for connecting various external devices. In this case, the external devices include, for example, devices such as a Universal Serial Bus (USB) memory and a printer. The network I/F 109 is an interface for performing data communication with the image forming apparatus 20 and the like using the network 8. The bus line 110 is an address bus, a data bus, or the like for electrically connecting the components illustrated in FIG. 2, such as the CPU 101.

The keyboard 111 is a kind of input device including a plurality of keys for inputting characters, numerical values, various instructions, and the like. The pointing device 112 is a kind of input device for selecting and executing various instructions, selecting an object to be processed, moving the cursor, and the like. A DVD-RW drive 114 controls reading or writing of various data from or to a DVD-RW 113, which is an example of a removable recording medium. The removable recording medium is not limited to a DVD-RW, and may be a DVD Recordable (DVD-R) or the like. The media I/F 116 controls reading or writing (storing) of data from or to a medium 115 such as a flash memory.

Figure 3:
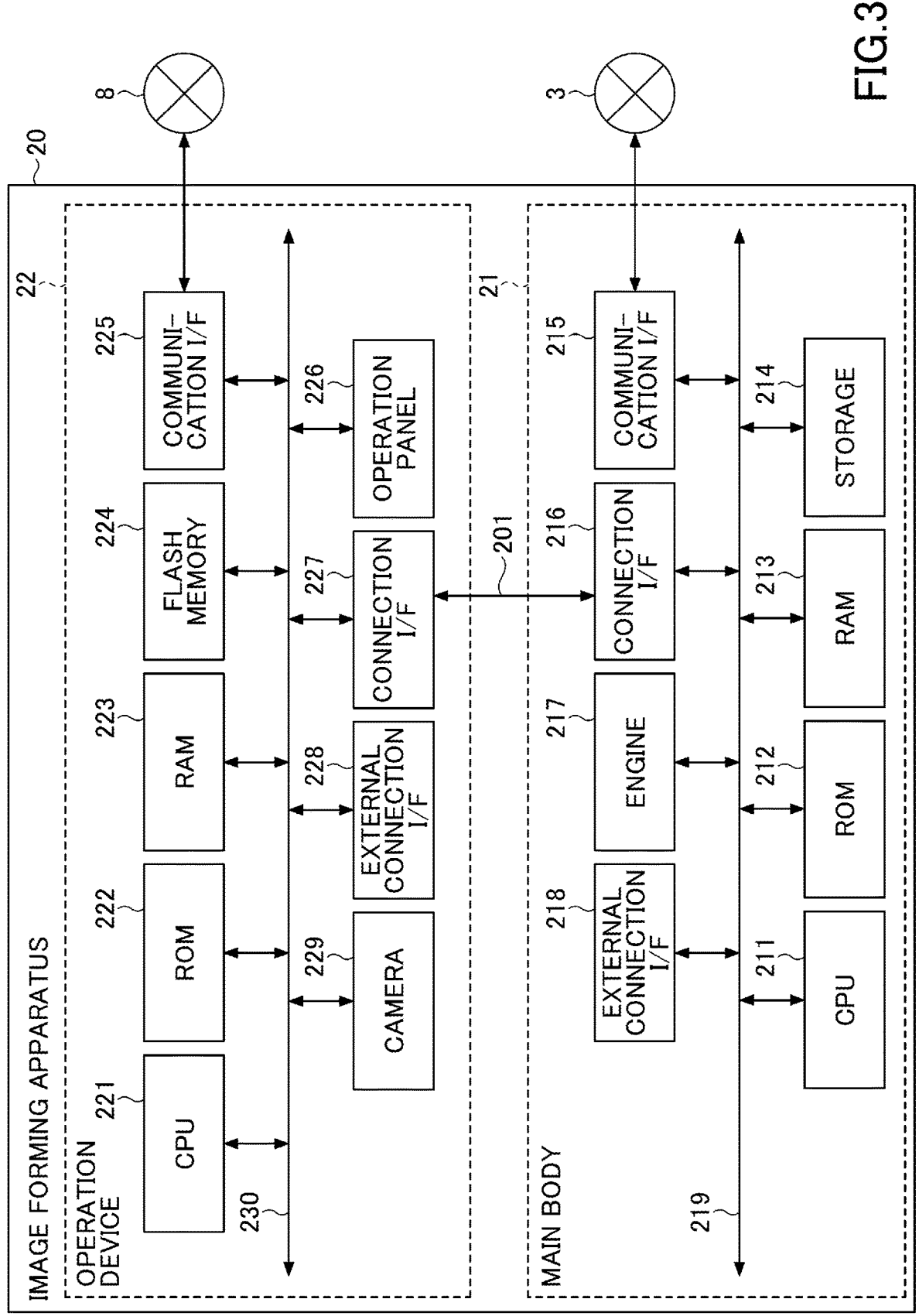
FIG. 3 is a diagram illustrating an example hardware configuration of an image forming apparatus.

FIG. 3 is a diagram illustrating an example hardware configuration of the image forming apparatus.

The image forming apparatus 20 includes a main body 21 that implements image forming functions, and an operation device 22 that receives the user's operation. Receiving the user's operation is a concept including receiving information (including a signal indicating coordinate values on a screen) input in accordance with the user's operation.

The main body 21 and the operation device 22 are communicably connected to each other via a communication path 201. The communication path 201 may be based on the USB standard, for example. The communication path 201 may be based on a standard other than the USB standard, regardless of whether it is wired or wireless.

The main body 21 includes a CPU 211, a ROM 212, a RAM 213, a storage 214, a communication I/F 215, a connection I/F 216, an engine 217, an external connection I/F 218, and a system bus 219.

The CPU 211 is an arithmetic unit that executes a program stored in the ROM 212, the storage 214, or the like using the RAM 213 as a work area to control the overall operation of the main body 21. For example, the CPU 211 uses the engine 217 to implement various functions such as copying, scanning, faxing, and printing.

The ROM 212 is a non-volatile memory that stores, for example, a basic input/output system (BIOS), which is executed to activate the main body 21, various settings, and the like. The RAM 213 is a volatile memory used as a work area or the like for the CPU 211. The storage 214 is a non-volatile storage device that stores, for example, an operating system (OS), an application program, various data, and the like, and is implemented by, for example, an HDD, a solid state drive (SSD), or the like.

The communication I/F 215 is a network interface such as a wireless LAN or a wired LAN for connecting the main body 21 to the telephone network 3 to communicate with an external device such as the facsimile 2. The connection I/F 216 is an interface for performing communication between the main body 21 and the operation device 22 via the communication path 201.

The engine 217 is a hardware component configured to perform general-purpose information processing and processing other than communication to implement functions such as copying, scanning, faxing, and printing. The engine 217 includes, for example, a scanner (image reader) for scanning and reading an image of a document, a plotter (image former) for performing printing on a sheet material such as paper, a fax device for performing facsimile communication, and the like. The engine 217 may further include specific options such as a finisher for finishing printed sheet materials, and an automatic document feeder (ADF) for automatically feeding a document.

The external connection I/F 218 is an interface for connecting an external device to the main body 21. Examples of the external device include an integrated circuit (IC) card reader, and a mobile sensor. The system bus 219 is connected to the components described above and configured to transmit an address signal, a data signal, various control signals, and the like.

The operation device 22 includes a CPU 221, a ROM 222, a RAM 223, a flash memory 224, a communication I/F 225, an operation panel 226, a connection I/F 227, an external connection I/F 228, a camera 229, and a system bus 230.

The CPU 221 is an arithmetic unit that executes a program stored in the ROM 222, the flash memory 224, or the like using the RAM 223 as a work area to control the overall operation of the operation device 22. The ROM 222 is a non-volatile memory that stores, for example, a BIOS executed to activate the operation device 22, various settings, and the like. The RAM 223 is a volatile memory used as a work area or the like for the CPU 221. The flash memory 224 is a non-volatile storage device that stores, for example, an OS, an application program, various data, and the like.

The communication I/F 225 is a network interface such as a wireless LAN or a wired LAN for connecting the operation device 22 to the network 8 to communicate with an external device such as the information processing system 10.

The operation panel 226 receives various inputs corresponding to the user's operations and displays various kinds of information. The operation panel 226 is, for example but not limited to, a liquid crystal display (LCD) having a touch panel function. The operation panel 226 may be implemented by, for example, an organic electroluminescence (EL) display having a touch panel function. Additionally or alternatively, the operation panel 226 may be provided with an operation device such as hardware keys, or a display device such as a lamp.

The connection I/F 227 is an interface for performing communication between the operation device 22 and the main body 21 via the communication path 201. The external connection I/F 228 is an interface such as a USB interface for connecting an external device.

The camera 229 is an imaging capturing device that captures an image of the user. The camera 229 may be installed outside the image forming apparatus 20 and connected to the operation device 22 via the external connection I/F 228. The system bus 230 is connected to the components described above and configured to transmit an address signal, a data signal, various control signals, and the like.

Next, a functional configuration of each of the apparatuses included in the data transfer system 1 according to this embodiment will be described.

Figure 4:
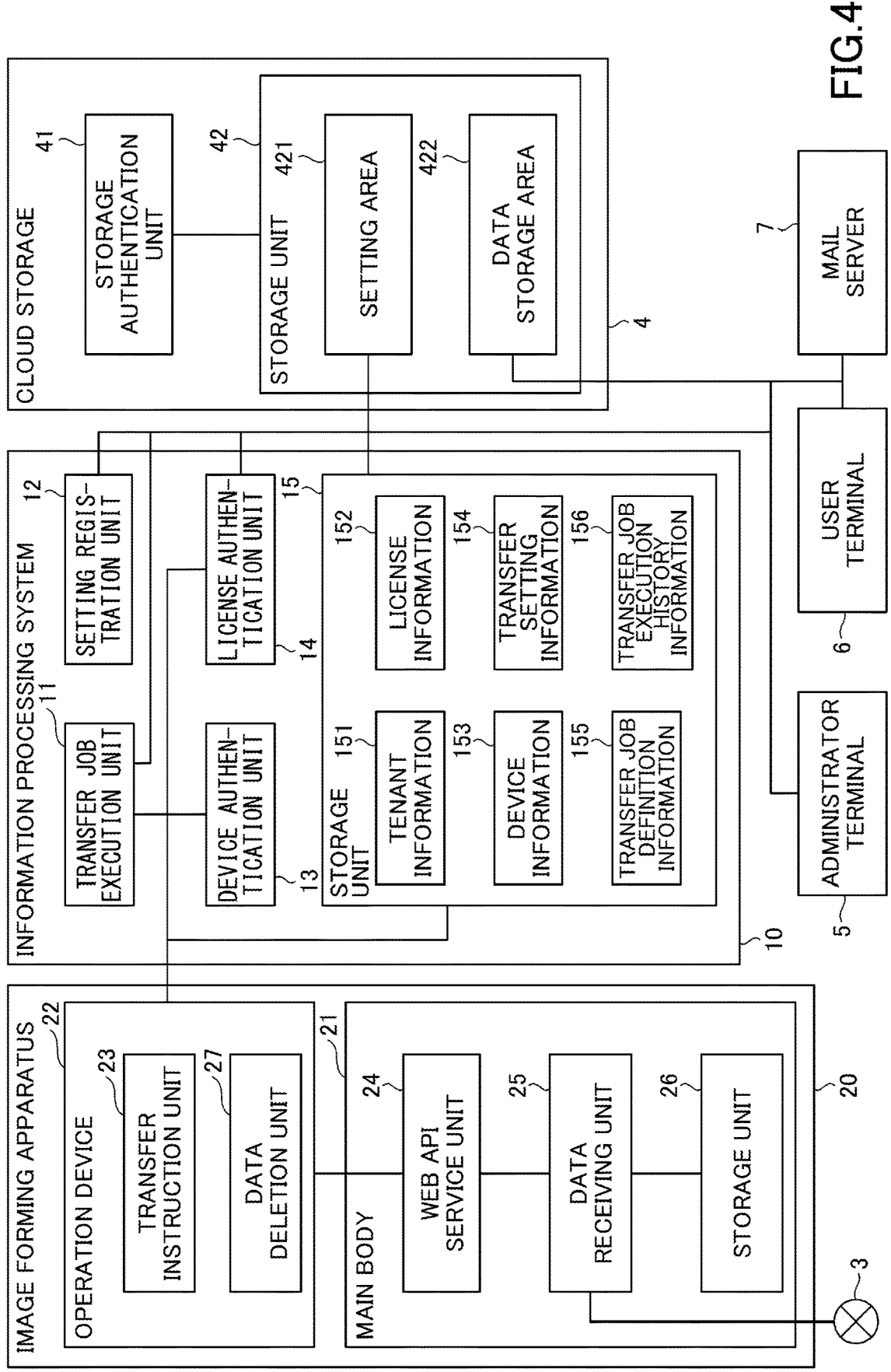
FIG. 4 is a diagram illustrating example functions of an information processing system and the image forming apparatus.

FIG. 4 is a diagram illustrating example functions of the information processing system and the image forming apparatus.

The information processing system 10 includes a transfer job execution unit 11, a setting registration unit 12, a device authentication unit 13, a license authentication unit 14, and a storage unit 15. The components described above are implemented by one or more information processing apparatuses 10a of the information processing system 10. For example, the functions of the information processing system 10 may be implemented in a distributed manner by an information processing apparatus A having fundamental functions such as the device authentication unit 13 and the license authentication unit 14, an information processing apparatus B having web applications such as the transfer job execution unit 11 and the setting registration unit 12, and an information processing apparatus C having a database that stores various kinds of information, such as the storage unit 15. Any other distribution method may be used, or all of the functions may be implemented by a single information processing apparatus 10a.

The transfer job execution unit 11 transfers facsimile data. Specifically, the transfer job execution unit 11 executes a process (hereinafter also referred to as a "transfer job") specified in transfer job definition information 155. The transfer job definition information 155 is stored in the storage unit 15 as data transfer application (such as a facsimile transfer application). The transfer job execution unit 11 acquires sort setting information stored in a setting area 421 of a storage unit 42 of the cloud storage 4, sorts received facsimile data into each folder in accordance with the acquired sort setting information, and transmits the facsimile data to a data storage area 422 of the storage unit 42 of the cloud storage 4.

The setting registration unit 12 registers transfer setting information 154 indicating settings used for a process executed by the transfer job execution unit 11. Specifically, the setting registration unit 12 transmits data indicating a setting screen to the administrator terminal 5, and receives the transfer setting information 154 from the administrator terminal 5. Then, the setting registration unit 12 stores the received transfer setting information 154 in the storage unit 15. The setting registration unit 12 is implemented as an administrator setting web page on which the tenant administrator configures settings for the data transfer application.

The device authentication unit 13 authenticates the image forming apparatus 20. Specifically, in response to receiving a signal requesting device authentication from the image forming apparatus 20, the device authentication unit 13 determines whether a machine identification number, included in the signal, is included in device information 153. If the device authentication unit 13 determines that the machine identification number is included in the device information 153, the device authentication unit 13 issues a device authentication ticket indicating that the device authentication has succeeded. The machine identification number is a number for identifying the image forming apparatus 20.

The license authentication unit 14 determines, based on license information 152 described below, whether the tenant has a license for using the web application. If the license authentication unit 14 determines that the tenant has the license, the license authentication unit 14 permits the use of the web application.

The storage unit 15 stores various kinds of information used to execute processes specified in the web application. For example, the storage unit 15 stores tenant information 151, license information 152, device information 153, transfer setting information 154, and transfer job definition information 155, and transfer job execution history information 156.

The tenant information 151 is information indicating the attribute of a tenant. For example, the tenant information 151 is information including items such as a "tenant ID" having a value representing an identifier identifying a tenant, and a "tenant name" having a value representing the name of the tenant.

The license information 152 is information indicating a license set for each tenant based on a contract between an organization that opened the tenant and a management company of the information processing system 10 (cloud service). Specifically, the license information 152 indicates the number of licenses for using the web application for each tenant. There are several types of licenses, such as a user license and a device license. In the case of the device license, one image forming apparatus 20 is assigned to one license for the tenant.

The device information 153 is information indicating the attribute of a device (apparatus). In the present embodiment, the device indicates the image forming apparatus 20. Specifically, the device information 153 is information including items such as a "machine identification number" having a value representing an identifier identifying a device (apparatus). The device information 153 is registered in association with the tenant information 151.

The transfer setting information 154 is setting information referred to by the transfer job execution unit 11. The transfer setting information 154 is input by the tenant administrator through a data transfer function setting screen displayed on the administrator terminal 5. The data transfer function setting screen will be described later in detail.

The transfer job definition information 155 defines, as components, processes included in each transfer job. For example, the transfer job definition information 155 specifies, as components, a process for acquiring sort setting information, a process for transferring data to the cloud storage 4, a process for notifying a user of information related to data transfer, and other processes. Further, the order of executing the processes is specified.

The transfer job execution history information 156 is information indicating a history of execution of transfer jobs. Specifically, in response to receiving an instruction to execute a transfer job from the image forming apparatus 20, the information processing system 10 adds a record to the transfer job execution history information 156, and updates the record in accordance with the execution status of each process of the transfer job. A specific example of the transfer job execution history information 156 will be described later.

The image forming apparatus 20 includes the main body 21 and the operation device 22.

The main body 21 implements image forming functions such as copying, scanning, and printing, that is, the internal functions of the image forming apparatus 20. Specifically, the main body 21 includes a web API service unit 24, a data receiving unit 25, and a storage unit 26.

The web API service unit 24 provides a web API to the operation device 22. The web API is an interface for using various functions of the main body 21. The web API includes an API for acquiring the machine identification number. The web API service unit 24 transmits the machine identification number stored in the main body 21 to the operation device 22 in response to an invocation of the API from the operation device 22.

The data receiving unit 25 receives facsimile data from the facsimile 2 via the telephone network 3. Then, the data receiving unit 25 stores the received facsimile data in the storage unit 26.

The storage unit 26 stores facsimile data. Further, the storage unit 26 stores the machine identification number of the image forming apparatus 20.

In response to the user's operation, the operation device 22 instructs the main body 21 to execute various processes. The operation device 22 includes an interface for selecting an application program to be activated. Specifically, the operation device 22 includes a transfer instruction unit 23 and a data deletion unit 27.

The transfer instruction unit 23 transfers facsimile data stored in the storage unit 26 to the information processing system 10. Specifically, when the data receiving unit 25 receives facsimile data, the transfer instruction unit 23 registers a data transfer process in queue information stored in the RAM 223. The queue information is information in which processes to be executed by the transfer instruction unit 23 are included in a queue. The transfer instruction unit 23 executes data transfer processes one by one in the order registered in the queue information, so as to transfer data to the information processing apparatus, including the transfer job execution unit 11, of the information processing system 10.

The transfer instruction unit 23 is implemented by a transfer application installed in the operation device 22 of the image forming apparatus 20. The tenant administrator can download the transfer application from an external application market server or the like and install the transfer application into the operation device 22 of the image forming apparatus 20.

The data deletion unit 27 executes a process for deleting facsimile data stored in the storage unit 26, periodically, for example, once a day, when a data deletion function is enabled. Specifically, the data deletion unit 27 registers a data deletion process in the queue information.

The cloud storage 4 includes a storage authentication unit 41 and the storage unit 42.

The storage authentication unit 41 determines, for each account, whether the cloud storage 4 can be used.

The storage unit 42 is a storage area set for each account. Specifically, the storage unit 42 includes the setting area 421 and the data storage area 422.

The setting area 421 is an area where sort setting information is to be stored. The sort setting information is transmitted from the administrator terminal 5 in response to an operation by the tenant administrator.

The data storage area 422 is an area where facsimile data transferred from the information processing apparatus, including the transfer job execution unit 11, of the information processing system 10 is to be stored. The data storage area 422 includes a plurality of folders. In the above-described sort setting information, a folder to which data is to be sorted is set for each transmission source.

Next, the operation of the data transfer system 1 will be described with reference to the drawings.

Figure 5:
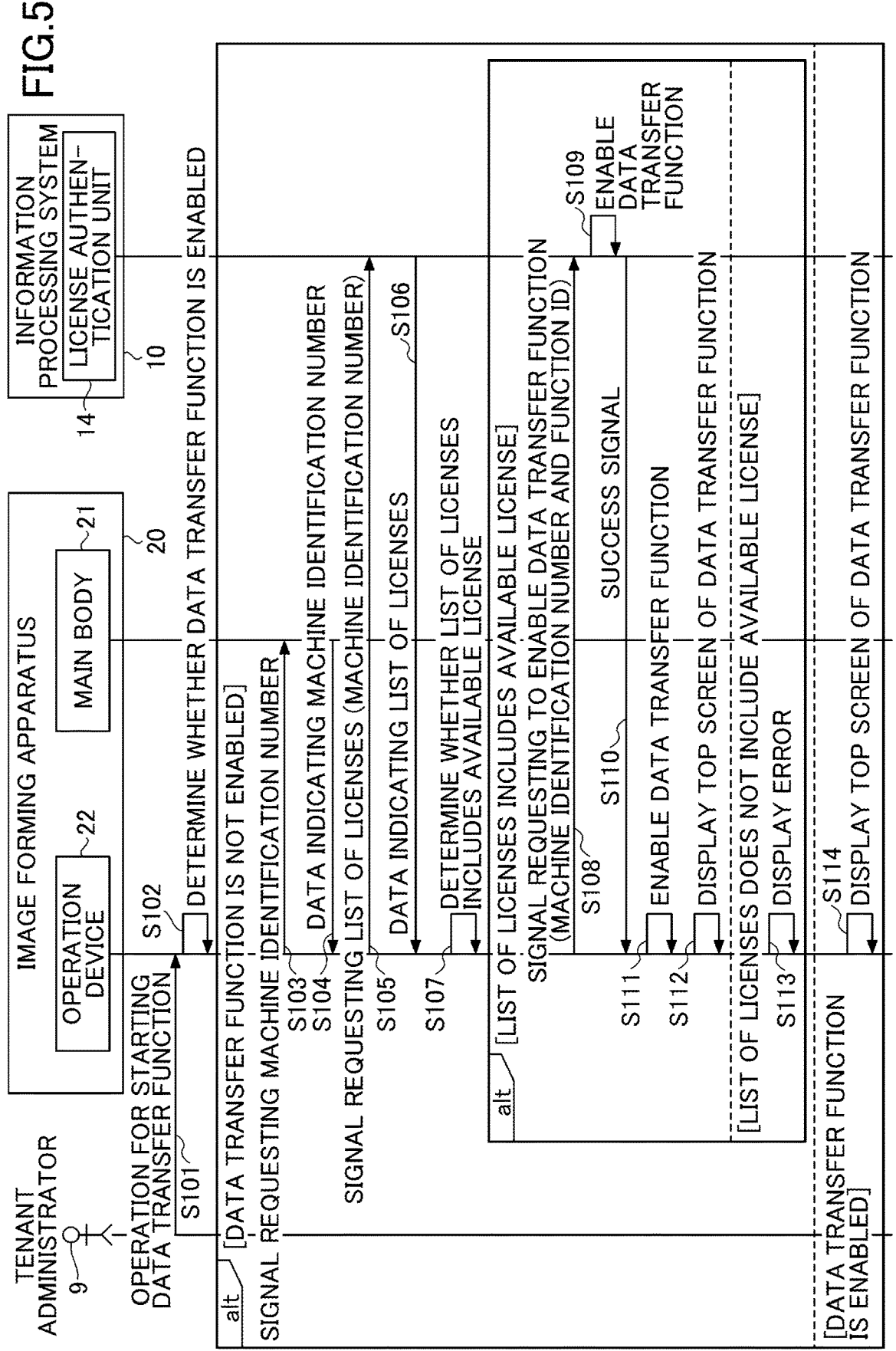
FIG. 5 is a diagram illustrating an example sequence of a data transfer function enabling process.

FIG. 5 is a diagram illustrating an example sequence of a data transfer function enabling process.

In order to use processes of the transfer job execution unit 11 of the information processing system 10, a tenant administrator 9 performs an operation for starting the data transfer function on a screen for operating the operation device 22 of the image forming apparatus 20 (step S101).

Figure 6:
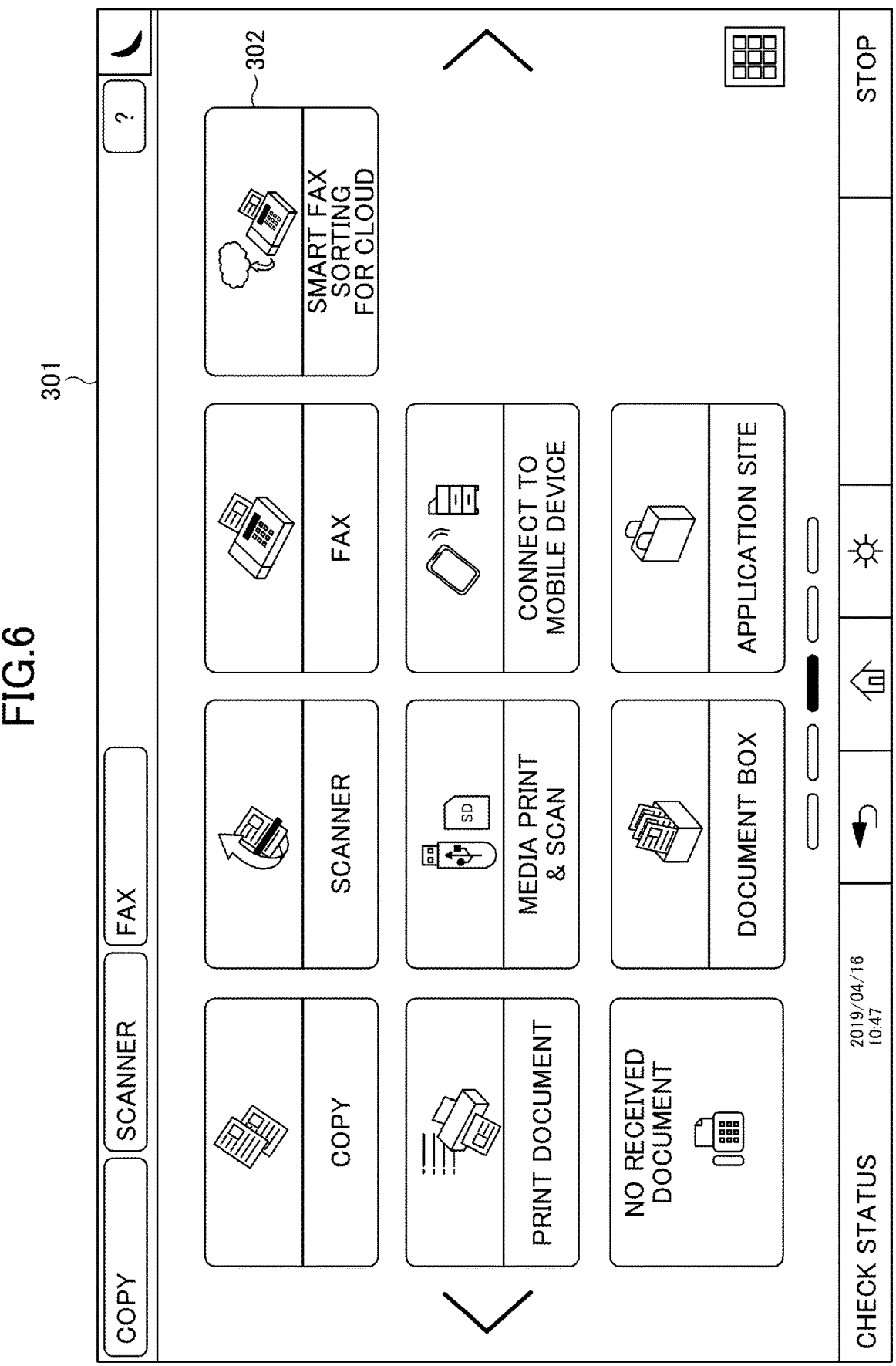
FIG. 6 is a diagram illustrating an example operation device functions list screen.

FIG. 6 is a diagram illustrating an example operation device functions list screen.

A functions list screen 301 includes a list of buttons for selecting functions. The list of buttons for selecting the functions includes a data transfer function selection button 302. The data transfer function selection button 302 is an icon image of a transfer application installed in the image forming apparatus 20. The tenant administrator 9 presses the data transfer function selection button 302 to perform an operation for starting the data transfer function.

Figure 7:
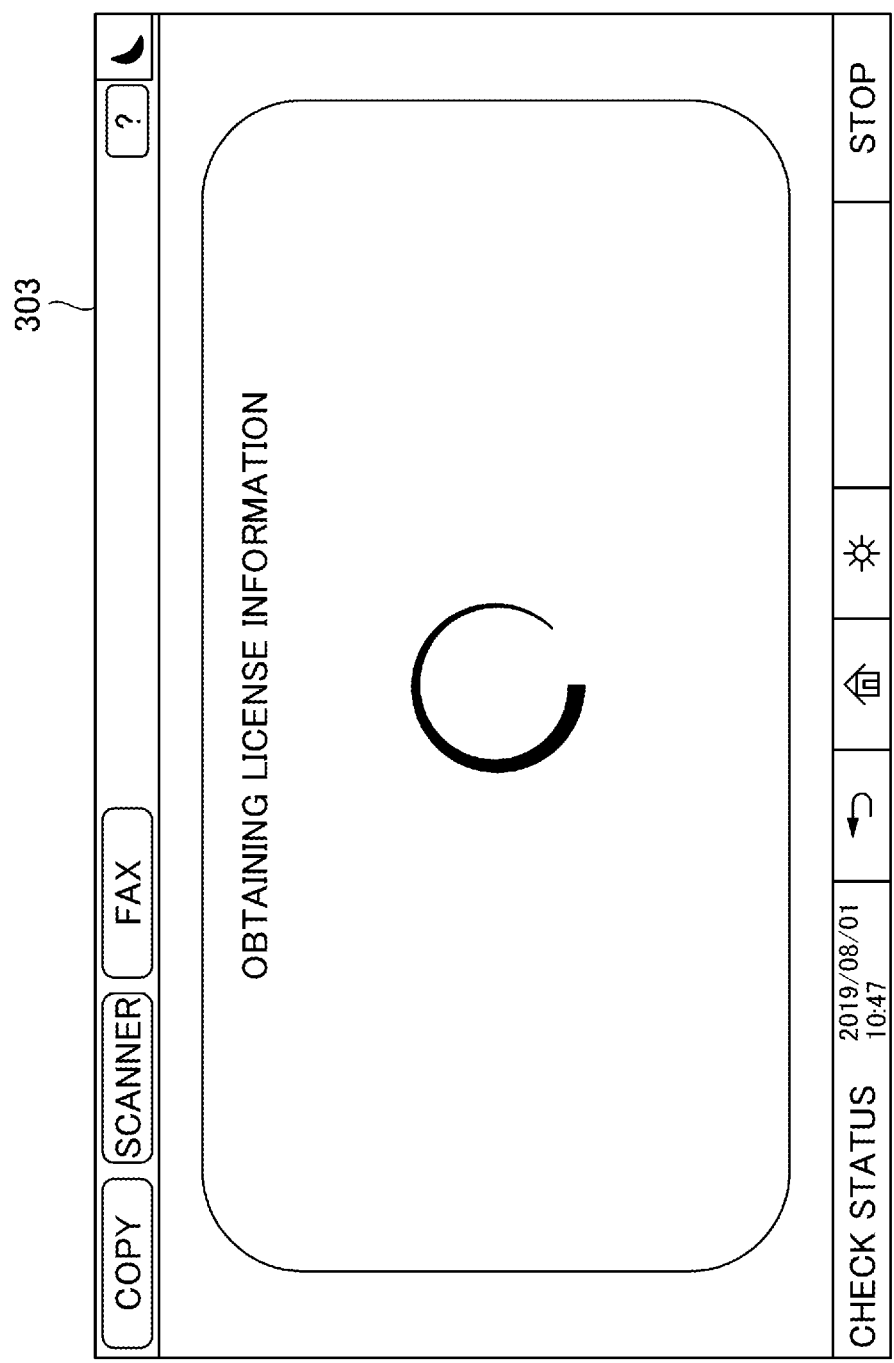
FIG. 7 is a diagram illustrating an example in-progress screen in the data transfer function enabling process.

FIG. 7 is a diagram illustrating an example in-progress screen in the data transfer function enabling process.

In response to the operation for starting the data transfer function, an authentication screen is displayed on the operation device 22. The operation device 22 receives user identification information such as an email address and a password through the authentication screen. The user identification information is transmitted to the information processing system 10. When the authentication function of the information processing system 10 authenticates that the user identification information indicates the tenant administrator 9, an in-progress screen 303 is displayed on the operation device 22.

Referring back to FIG. 5, the transfer instruction unit 23 of the operation device 22 determines whether the data transfer function is enabled (step S102). Specifically, when flag information, indicating that the data transfer function is enabled, is stored, the transfer instruction unit 23 determines that the data transfer function is enabled.

If the transfer instruction unit 23 determines that the data transfer function is not enabled, the transfer instruction unit 23 transmits a signal requesting the machine identification number of the image forming apparatus 20 to the main body 21 (step S103). The web API service unit 24 of the main body 21 reads data indicating the machine identification number from the storage unit 26. Then, the web API service unit 24 transmits the data indicating the machine identification number to the operation device 22 (step S104).

The transfer instruction unit 23 of the operation device 22 transmits a signal requesting a list of licenses to the information processing system 10 (step S105). The signal requesting a list of licenses includes the machine identification number of the image forming apparatus 20. Note that if the tenant administrator 9 is successfully authenticated based on the user identification information and the machine identification number of the image forming apparatus 20 is not associated with the tenant (when the image forming apparatus 20 is not registered to the tenant), the machine identification number is automatically registered with respect to the tenant.

The license authentication unit 14 of the information processing system 10 refers to the license information 152, and transmits data indicating a list of licenses (step S106). Specifically, the license authentication unit 14 identifies the tenant from the tenant information 151 associated with the transmitted machine identification number. Then, the license authentication unit 14 acquires, from the license information 152, data indicating a list of web applications (web services), which are owned and contracted by the identified tenant, and also a list of licenses for the respective web applications (web services). Then, the license authentication unit 14 transmits the data to the image forming apparatus 20.

The transfer instruction unit 23 of the operation device 22 determines whether the list of web applications under contract includes a web application of the information processing system 10, which is used as the transfer destination by the transfer application (that is, the transfer instruction unit 23) of the image forming apparatus 20, and determines whether the list of licenses includes an available license (step S107). Specifically, the transfer instruction unit 23 (transfer application) searches web applications corresponding to an application type designated by the transfer application, from the list of web applications under contract. From among licenses for the web applications corresponding to the transfer application, if there are one or more licenses to which the image forming apparatus 20 or the like is not assigned, the transfer instruction unit 23 determines that the list of licenses includes an available license.

If a validity period is set for each license, the validity period may be added as a condition in step S106 or S107. When the information processing system 10 does not include a web application corresponding to the transfer application of the image forming apparatus 20, in step S106, the license authentication unit 14 may transmit a signal indicating an error.

When the transfer instruction unit 23 determines that the list of licenses includes an available license, the transfer instruction unit 23 transmits a signal requesting to enable the data transfer function to the information processing system 10 (step S108). The signal requesting to enable the data transfer function includes the machine identification number of the image forming apparatus 20.

The license authentication unit 14 enables the data transfer function (step S109). Specifically, the license authentication unit 14 selects one license to which no apparatus or device is assigned among the licenses of the tenant, and registers the selected license in association with the received machine identification number. As a result, the number of licenses to which no apparatus or device is assigned is decreased by 1.

Then, the license authentication unit 14 transmits a success signal to the image forming apparatus 20 (step S110). The transfer instruction unit 23 of the operation device 22 enables the data transfer function (step S111). Specifically, the transfer instruction unit 23 sets the value of the flag information indicating that the data transfer function is enabled or disabled to "enabled" and stores the flag information.

Thus, the next time an operation for starting the data transfer function is performed by the tenant administrator 9, the transfer instruction unit 23 determines that the data transfer function is enabled in step S102.

After step S111, the transfer instruction unit 23 displays a top screen of the data transfer function (step S112).

If the transfer instruction unit 23 determines that the list of licenses does not include an available license in step S107, the transfer instruction unit 23 displays an error (step S113). Specifically, the transfer instruction unit 23 displays an error screen.

Figure 8:
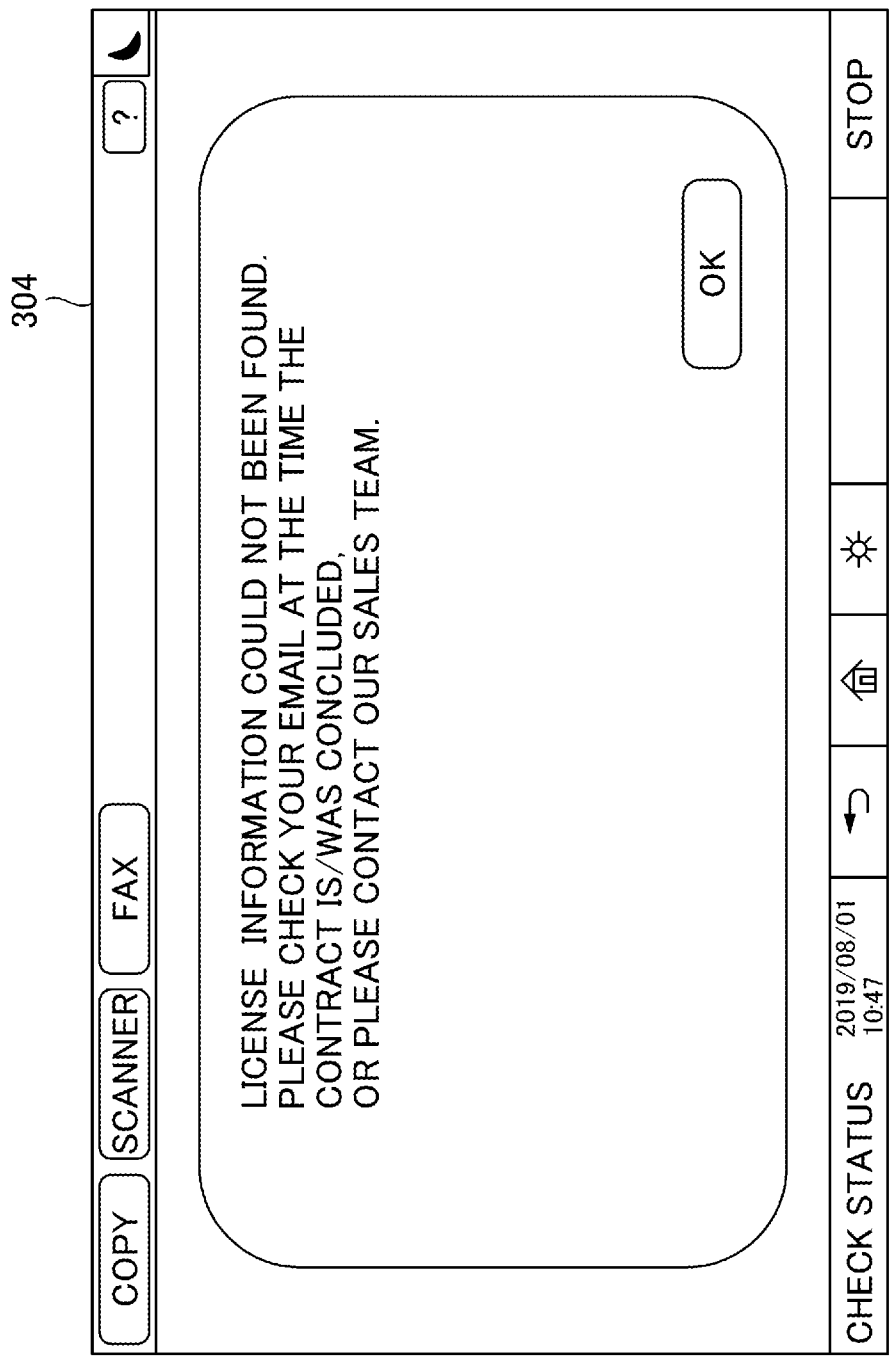
FIG. 8 is a diagram illustrating an example error screen in the data transfer function enabling process.

FIG. 8 is a diagram illustrating an example error screen in the data transfer function enabling process.

An error screen 304 displays a message indicating that no license has been found.

Referring back to FIG. 5, when the transfer instruction unit 23 determines that the data transfer function is enabled in step S102, the transfer instruction unit 23 displays the top screen of the data transfer function (step S114).

Figure 9:
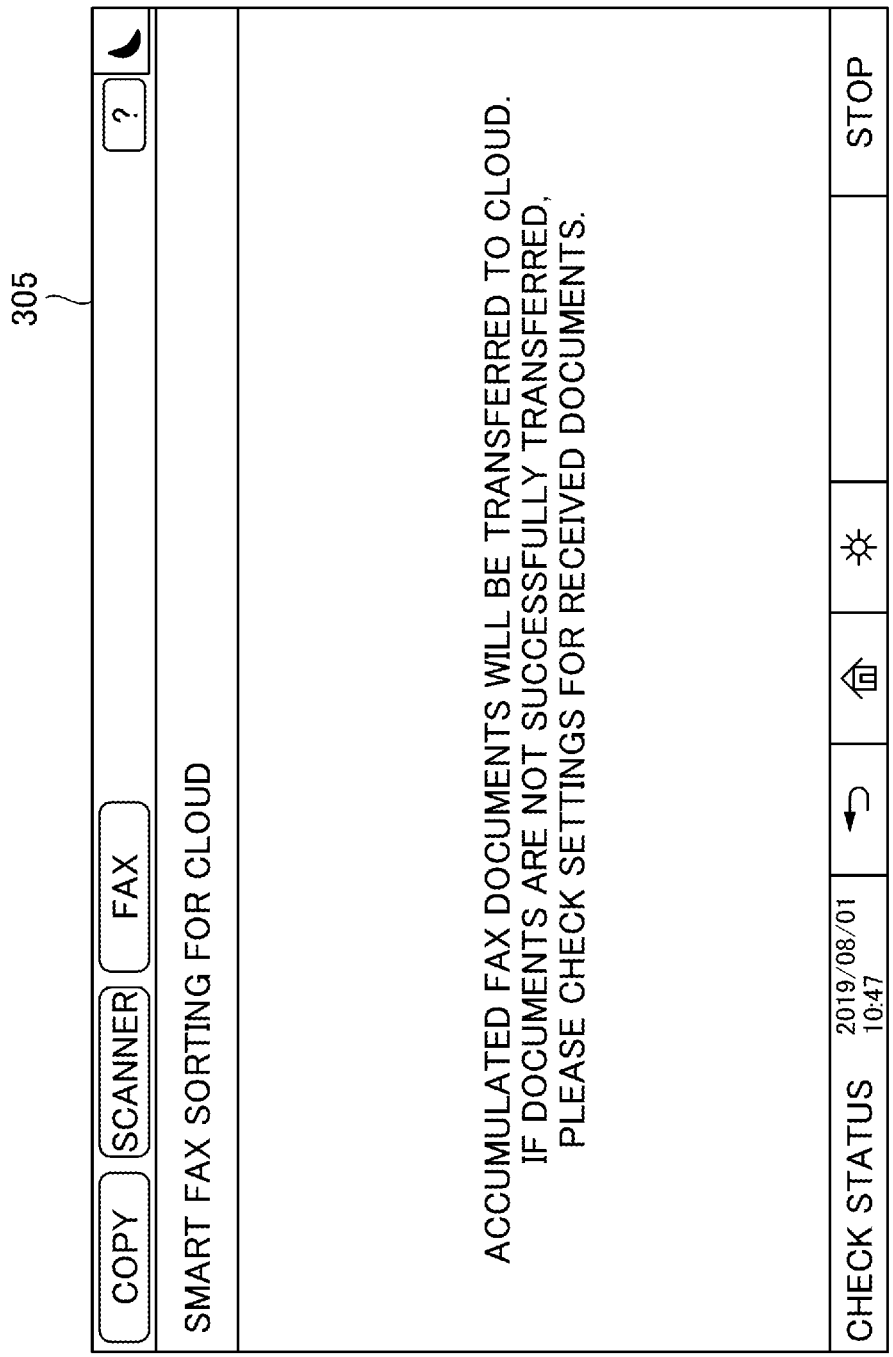
FIG. 9 is a diagram illustrating an example top screen of a data transfer function.

FIG. 9 is a diagram illustrating an example top screen of the data transfer function.

A top screen 305 displays a function introduction message indicating the content of the data transfer function. The top screen 305 is displayed when it is determined that the data transfer function is enabled and when an icon is pressed while the transfer application is in operation after the data transfer function is enabled. Since the data transfer function transfers data upon receipt of facsimile data, the top screen 305 does not include a display prompting a transfer operation. However, the top screen 305 may include a display for accepting an operation such as execution of batch transfer of pieces of accumulated facsimile data that have not been transmitted, or setting for transfer (such as designation of the batch transfer time or a file format for transfer).

Next, an operation for setting the data transfer function by the tenant administrator 9 will be described with reference to the drawings.

Figure 10:
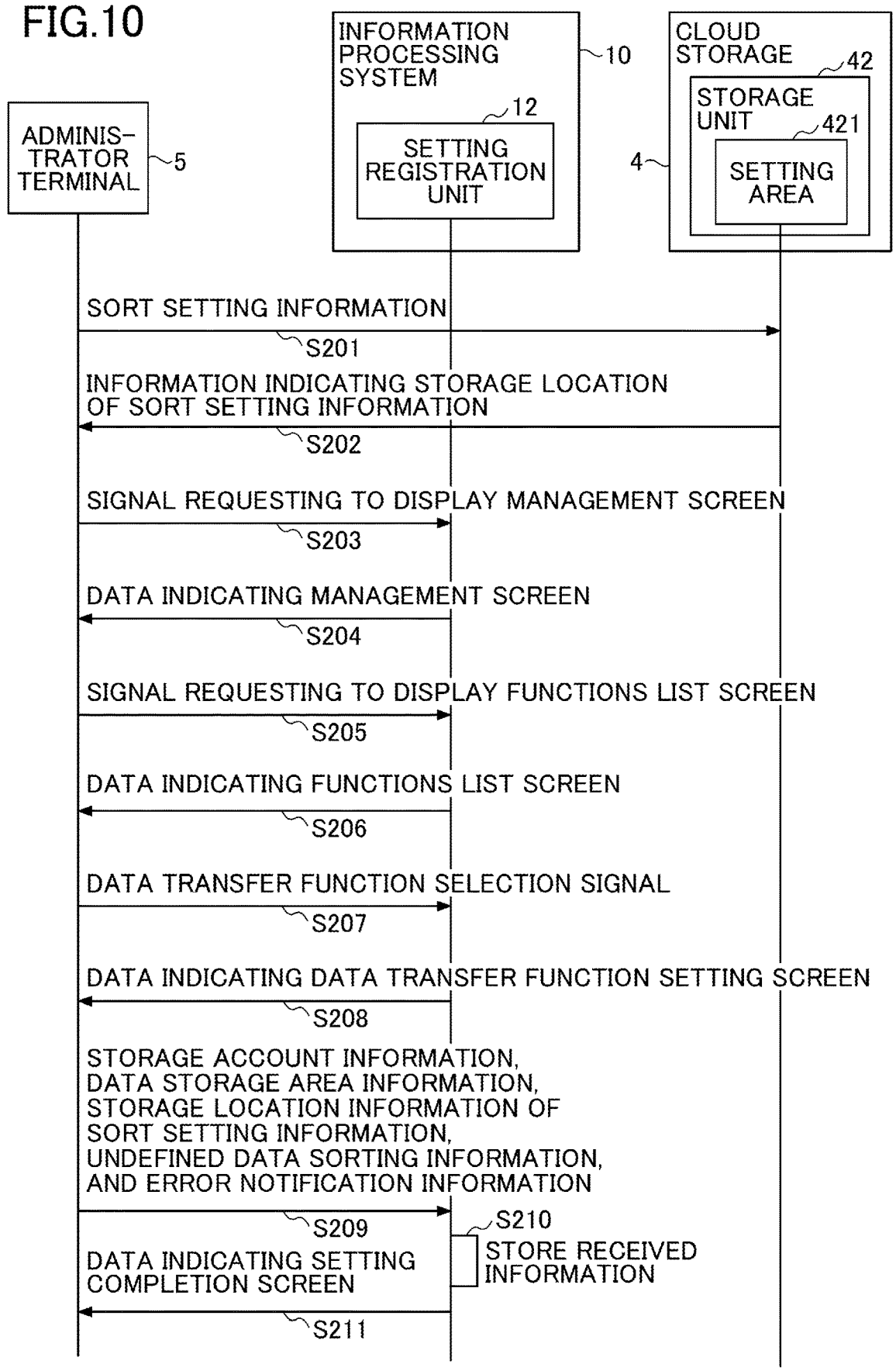
FIG. 10 is a diagram illustrating an example sequence of a data transfer function setting process.

FIG. 10 is a diagram illustrating an example sequence of a data transfer function setting process.

In response to an operation by the tenant administrator 9, the administrator terminal 5 generates sort setting information, and transmits the sort setting information to the cloud storage 4 (step S201). The sort setting information is a file including tabular data, such as an Excel file. The administrator terminal 5 transmits the file to the cloud storage 4 in response to an operation of storing the file into a folder desired by the tenant administrator 9 on an operation screen displayed on the web browser of the administrator terminal 5 for operating the cloud storage 4.

FIG. 11 is a diagram illustrating an example of sort setting information.

Sort setting information 501 includes items "transmission source number", "sort destination folder name", and "notification email address".

The item "transmission source number" has a value indicating the fax number of the transmission source of facsimile data received by the image forming apparatus 20.

The item "sort destination folder name" has a value indicating the name of the sort destination folder serving as a storage location of the facsimile data. The folder name may be a company name, an organization name, or the like corresponding to the fax number of the transmission source of the facsimile data.

The item "notification email address" has a value indicating the email address of the transmission destination of the notification email. The email address is an address accessible from a terminal such as the user terminal 6 or the administrator terminal 5.

Referring back to FIG. 10, in response to receiving the sort setting information 501 from the administrator terminal 5, the cloud storage 4 stores the received sort setting information 501 in the setting area 421 of the storage unit 42. The setting area 421 is a folder in which the sort setting information 501, selected on the web browser of the administrator terminal 5, is stored. When the storage location folder is selected on the web browser of the administrator terminal 5, information indicating the storage location of the sort setting information 501 is displayed in a uniform resource locator (URL) display field of the web browser. Thus, the information (URL) indicating the storage location of the sort setting information 501 has been transmitted to the administrator terminal 5 (step S202).

In response to an operation by the tenant administrator 9, the administrator terminal 5 transmits a signal requesting to display a management screen to the information processing system 10 (step S203). The setting registration unit 12 of the information processing system 10 transmits data indicating a management screen for the web application (data transfer application) to the administrator terminal 5 (step S204).

The administrator terminal 5 displays the management screen. Then, in response to an operation by the tenant administrator 9, the administrator terminal 5 transmits a signal requesting to display a functions list screen (step S205). The functions list screen is a screen indicating a list of functions to be managed by the tenant to which the tenant administrator 9 belongs.

The setting registration unit 12 of the information processing system 10 transmits data indicating the functions list screen to the administrator terminal 5 (step S206). The administrator terminal 5 displays the functions list screen.

FIG. 12 is a diagram illustrating an example functions list screen.

A functions list screen 306 includes a list of buttons for selecting functions to be managed by the tenant to which the tenant administrator 9 belongs. The list of buttons includes a data transfer function selection button 307. The functions to be managed by the tenant are web applications (web services) under contract, and a management screen for the web applications under contract can be opened by the web browser of the administrator terminal 5.

Referring back to FIG. 10, in response to the data transfer function selection button 307 being pressed, the administrator terminal 5 transmits a data transfer function selection signal to the information processing system 10 (step S207). The setting registration unit 12 of the information processing system 10 transmits data indicating a data transfer function setting screen to the administrator terminal 5 (step S208). The administrator terminal 5 displays the data transfer function setting screen.

FIG. 13 is a diagram illustrating an example data transfer function setting screen.

A data transfer function setting screen 308 includes a "select account" button 309, a "select folder" button 310, a "select file" button 311, an "undefined data storage folder name" input field 312, an "undefined data notification email address" input field 313, and an "notification email address in case of error" input field 314.

The "select account" button 309 is a graphical user interface (GUI) for selecting the account of the cloud storage 4, which is registered in advance by the tenant administrator 9. In a data transfer process described below, facsimile data is sorted and transferred to the storage area set for the selected account. The GUI is a button of a web page, an input item, or the like on a setting screen displayed on the web browser of the administrator terminal 5. The GUI is not limited to a web browser and may be implemented by a dedicated application.

The "select folder" button 310 is a GUI for selecting a folder to which the facsimile data is to be transferred, within the storage area set for the account selected with the "select account" button 309. In the data transfer process described below, the facsimile data is sorted and transferred to a folder selected with the "select folder" button 310 and indicated by the value of the item "sort destination folder name" of the sort setting information 501.

The "select file" button 311 is a GUI for selecting the location where the sort setting information 501 is stored in the cloud storage 4. The location where the sort setting information 501 is stored is indicated by, for example, a combination of a path name and a file name.

The "undefined data storage folder name" input field 312 is a GUI for entering the name of a sort destination folder of facsimile data transmitted from a transmission source number not defined in the sort setting information 501.

The "undefined data notification email address" input field 313 is a GUI for entering the email address of the transmission destination of the notification email when facsimile data is transmitted from a transmission source number not defined in the sort setting information 501.

The "notification email address in case of error" input field 314 is a GUI for entering the email address of the transmission destination of the notification email when an error occurs in the data transfer function.

Referring back to FIG. 10, the administrator terminal 5 transmits the information entered by the tenant administrator 9, that is, storage account information, data storage area information, storage location information of the sort setting information 501, undefined data sorting information, and error notification information, to the information processing system 10 (step S209).

The storage account information is information indicating an account selected by pressing the "select account" button 309. The storage account information includes, for example, an ID identifying an account, and a password for authentication.

The data storage area information is information indicating a storage area selected by pressing the "select folder" button 310.

The storage location information of the sort setting information 501 is information indicating a location selected by pressing the "select file" button 311.

The undefined data sorting information is information indicating a folder name entered in the "undefined data storage folder name" input field 312, and an email address entered in the "undefined data notification email address" field 313.

The error notification information is information indicating an email address entered in the "notification email address in case of error" input field 314.

The setting registration unit 12 of the information processing system 10 stores the received information in the storage unit 15 as the transfer setting information 154 (step S210). Then, the setting registration unit 12 transmits data indicating a setting completion screen to the administrator terminal 5 (step S211).

Next, the operation of receiving facsimile data at the image forming apparatus 20 will be described with reference to the drawings.

FIG. 14 is a diagram illustrating an example sequence of a data reception process.

In response to a facsimile transmission operation, the facsimile 2 transmits facsimile data to the image forming apparatus 20 (step S301). The facsimile data includes image data and metadata. The metadata is data indicating the attribute of the image data and includes at least the fax number of the transmission source.

In response to receiving the facsimile data via a fax line, the Internet, or the like, the data receiving unit 25 of the main body 21 of the image forming apparatus 20 stores the facsimile data and accumulated information in the storage unit 26 (step S302). Specifically, the data receiving unit 25 converts the image data included in the received facsimile data into, for example, a general-purpose data format such as a Portable Document Format (PDF) format and stores the resulting image data as facsimile data.

The data receiving unit 25 generates accumulated information based on the metadata included in the facsimile data.

Figure 15:
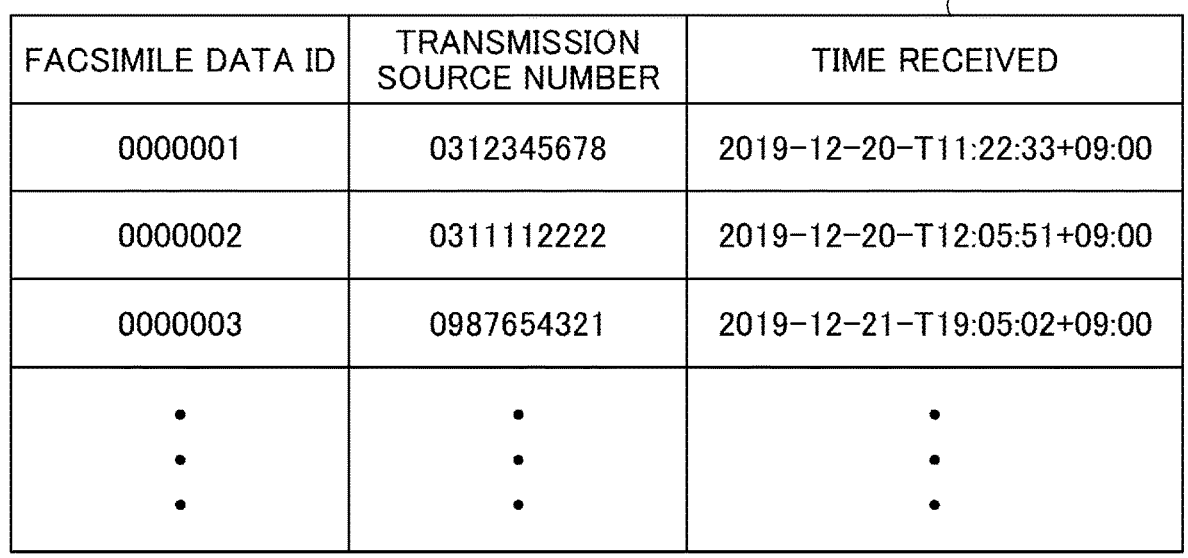
FIG. 15 is a first diagram illustrating an example of accumulated information.

FIG. 15 is a first diagram illustrating an example of accumulated information.

Accumulated information 509 includes items "facsimile data ID", "transmission source number", and "time received".

The item "facsimile data ID" represents an identifier for identifying received facsimile data. When inserting a record into the accumulated information 509, the data receiving unit 25 numbers a facsimile data ID.

The item "transmission source number" represents the fax number of the transmission source of the facsimile data. The data receiving unit 25 extracts the fax number of the transmission source from the metadata and sets the value of the item "transmission source number".

The item "time received" represents the time at which the facsimile data is received. The data receiving unit 25 sets the time at which the facsimile data and the accumulated information are stored as the value of the item "time received".

Referring back to FIG. 14, the data receiving unit 25 transmits a signal (reception notification signal) indicating the reception of the facsimile data to the operation device 22 (step S303). The reception notification signal includes the facsimile data ID.

The transfer instruction unit 23 of the operation device 22 adds a data transfer process to the queue (step S304). Specifically, the transfer instruction unit 23 adds a record indicating a process for transferring the received facsimile data to the end of the queue in the queue information stored in the RAM 223.

Next, an operation for transferring facsimile data by the data transfer system 1 will be described with reference to the drawings.

Figure 16:
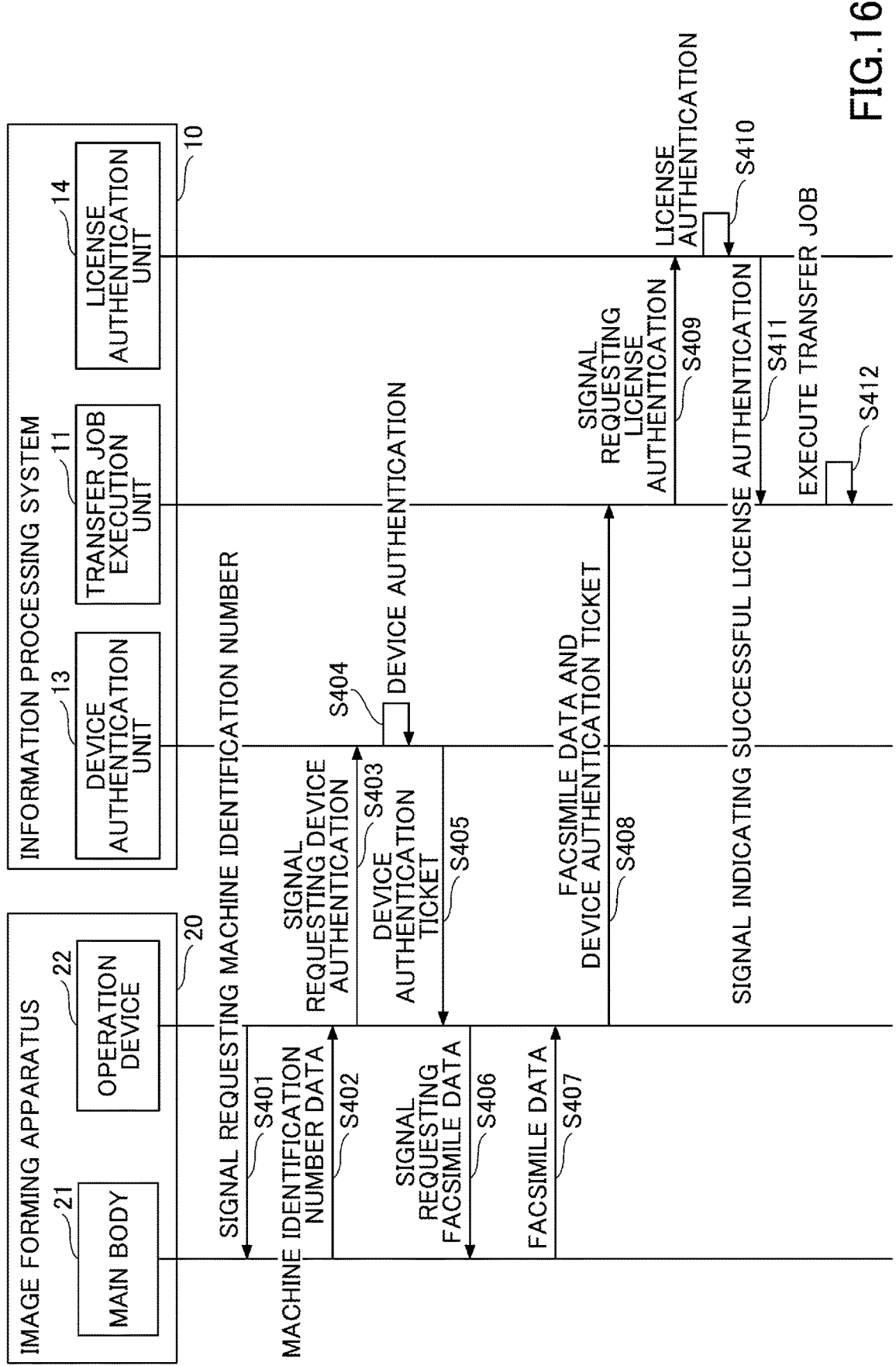
FIG. 16 is a diagram illustrating an example sequence of a data transfer process.

FIG. 16 is a diagram illustrating an example sequence of a data transfer process.

In response to the completion of the previous process for adding the data transfer process in the queue information, the transfer instruction unit 23 of the operation device 22 starts the data transfer process. The transfer instruction unit 23 transmits a signal requesting the machine identification number of the image forming apparatus 20 to the main body 21 (step S401).

The web API service unit 24 acquires machine identification number data stored in the storage unit 26, and transmits the acquired machine identification number data to the operation device (step S402).

Then, the transfer instruction unit 23 of the operation device 22 transmits a signal requesting device authentication to the information processing system 10 (step S403). The signal requesting device authentication includes the machine identification number data.

The device authentication unit 13 of the information processing system 10 authenticates the device (apparatus) (step S404). Specifically, the device authentication unit 13 determines whether the machine identification number is included in the device information 153. If the device authentication unit 13 determines that the machine identification number is included in the device information 153, the device authentication unit 13 transmits a device authentication ticket indicating that the device authentication has succeeded to the image forming apparatus 20 (step S405).

Then, the transfer instruction unit 23 of the operation device 22 transmits a signal requesting facsimile data to the main body 21 (step S406). The signal requesting facsimile data includes a facsimile data ID. The main body 21 acquires facsimile data from the storage unit 26, based on the facsimile data ID included in the received signal, and transmits the acquired facsimile data to the operation device 22 (step S407).

The transfer instruction unit 23 of the operation device 22 transmits the facsimile data together with the device authentication ticket to the information processing system 10 (step S408).

In response to receipt of the facsimile data, the transfer job execution unit 11 transmits a signal requesting license authentication to the license authentication unit 14 (step S409).

The license authentication unit 14 executes license authentication (step S410). Specifically, the license authentication unit 14 identifies a machine identification number based on the device authentication ticket, and determines whether the license of the tenant corresponding to the machine identification number is assigned to the device (apparatus) corresponding to the machine identification number. As a result, the license authentication unit 14 can determine whether the data transfer function is enabled.

The license authentication unit 14 may determine whether the corresponding license is within the validity period.

When the license authentication is successful, the license authentication unit 14 transmits a signal indicating successful license authentication to the transfer job execution unit 11 (step S411). Then, the transfer job execution unit 11 executes a transfer job specified in the transfer job definition information 155 (step S412). The sequence of the transfer job will be described later.

FIG. 17 is a diagram illustrating an example of transfer job definition information.

The transfer job definition information is information defining a series of processes as a workflow composed of a plurality of components. For example, the transfer job definition information 155 includes, as components, a sort setting information acquisition process 155a, a data transfer process 155b, an email transmission process 155c, and an error email transmission process 155d.

The transfer job definition information 155 also includes information specifying the processing order of the components and the processing start condition of each of the components. For example, the transfer job definition information 155 specifies that the sort setting information acquisition process 155a is executed first, the data transfer process 155b is executed after the completion of the sort setting information acquisition process 155a, and the email transmission process 155c is then executed after the completion of the data transfer process 155b.

The transfer job definition information 155 also specifies that the error email transmission process 155d is executed in a case where an error occurs in any of the sort setting information acquisition process 155a, the data transfer process 155b, and the email transmission process 155c.

Each of the components specifies a method for acquiring information used to execute a corresponding process. Examples of the information include the source from which the information is acquired, and the destination to which data is transmitted.

Note that the transfer job definition information 155 may include other components. For example, the transfer job definition information 155 may include components such as a process for acquiring setting information, a process for modifying an image of facsimile data (such as removing a blank sheet and correcting top and bottom), and a process for generating a folder in the cloud storage 4 to which to transmit data.

A transfer job defined in the transfer job definition information 155 described above includes a series of processes including a first process for transferring data and a second process related to the first process. The data transfer process 155b is an example of the first process, and the email transmission process 155c is an example of the second process.

FIG. 18 is a diagram illustrating a transfer status.

The transfer job execution unit 11 updates the value of the transfer status of a transfer job included in the transfer job execution history information 156 in accordance with the execution status of the transfer job.

Specifically, as in the case of a transfer job execution status A illustrated in FIG. 18, the transfer job execution unit 11 stores the transfer status as "accepted" when a transfer job is accepted and no component process has been started. The transfer status "accepted" is a value indicating that the transfer job execution unit 11 has accepted a transfer instruction.

Further, as in the case of transfer job execution statuses B, C and D illustrated in FIG. 18, when any of the component processes have been started, the transfer job execution unit 11 updates the transfer statuses to "processing". The transfer status "processing" is a value indicating that a transfer job is being executed.

Further, as in the case of a transfer job execution status E illustrated in FIG. 18, when all the component processes, except for the error email transmission process, have been successfully completed, the transfer job execution unit 11 updates the transfer status to "completed". The transfer status "completed" is a value indicating that a transfer job has been successfully completed.

Further, as in the case of a transfer job execution status F illustrated in FIG. 18, if an error occurs during any of the component processes, the transfer job execution unit 11 updates the transfer status to "error". The transfer status "error" is a value indicating that a transfer job is abnormally terminated.

Note that the transfer job execution unit 11 updates the transfer status to "error" if an error occurs during any of the component processes, that is, the sort setting information acquisition process 155a, the data transfer process 155b, and the email transmission process 155c that are performed in a normal state. Further, the transfer job execution unit 11 sets the transfer status to "error" regardless of whether the error email transmission process 155d is completed successfully.

As described above, records having the transfer statuses "completed" and "error" do not change over time because the processes have already been completed. In contrast, the transfer statuses "accepted" and "processing" are temporary statuses. That is, records having the transfer statuses "accepted" and "processing" change to the transfer status "completed" or "error" over time.

Figure 19:
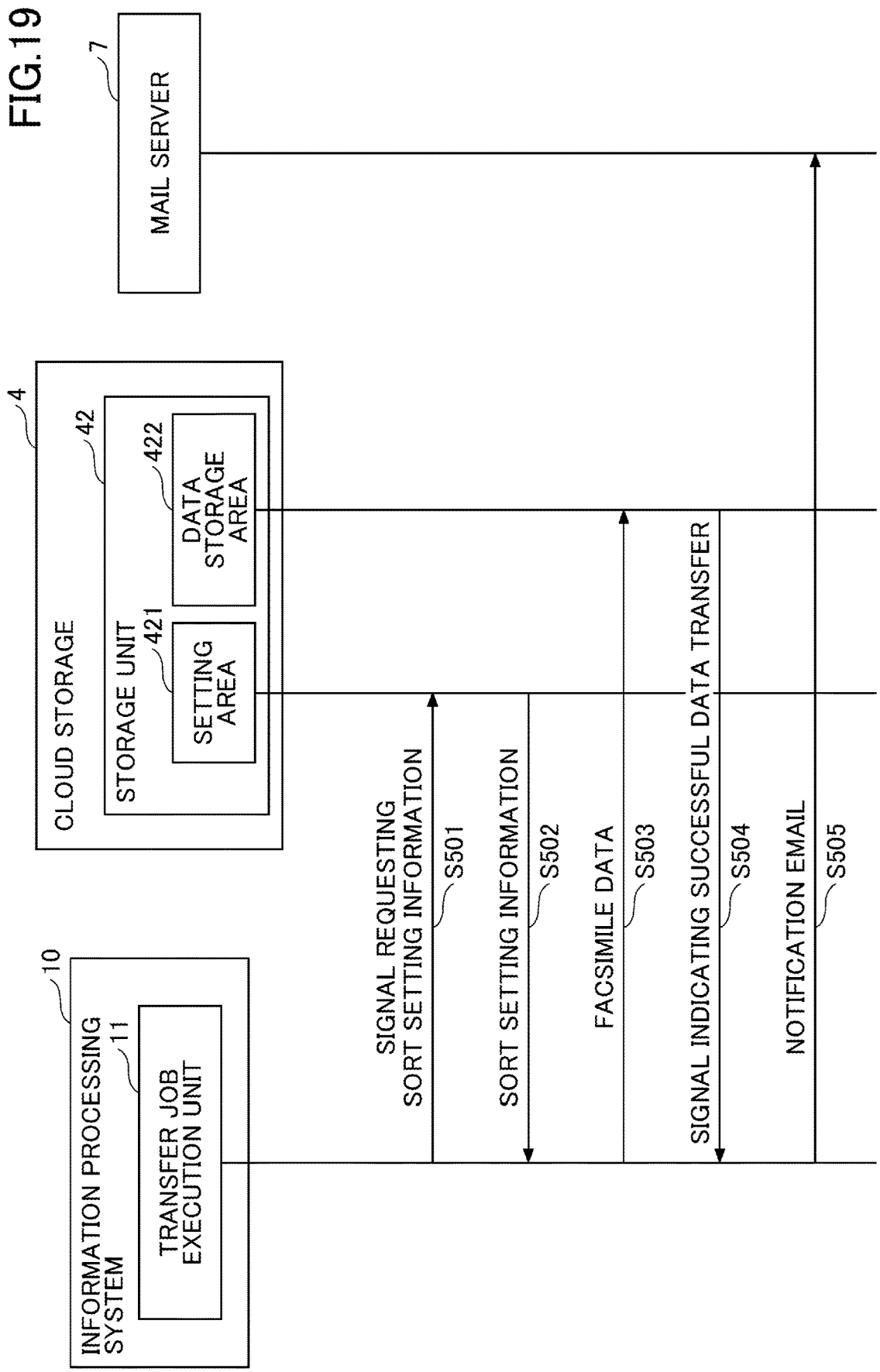
FIG. 19 is a diagram illustrating an example sequence of a transfer job execution process.

FIG. 19 is a diagram illustrating an example sequence of a transfer job execution process.

When step S412 illustrated in FIG. 16 is started, the transfer job execution unit 11 executes a transfer job execution process illustrated in FIG. 19. First, the transfer job execution unit 11 adds a record of facsimile data to the transfer job execution history information 156 in the storage unit 15. Specifically, the transfer job execution unit 11 adds a record having the transfer status "accepted" to the transfer job execution history information 156.

Next, the transfer job execution unit 11 executes the sort setting information acquisition process 155a. That is, the transfer job execution unit 11 transmits a signal requesting the sort setting information 501 to the cloud storage 4 (step S501). Specifically, the signal requesting the sort setting information 501, transmitted from the transfer job execution unit 11, includes the storage location information of the sort setting information 501 and the storage account information, which are included in the transfer setting information 154.

When the sort setting information acquisition process 155a, which is the first component, is started, the transfer job execution unit 11 updates the transfer status included in the transfer job execution history information 156 stored in the storage unit 15 to "processing".

The storage authentication unit 41 of the cloud storage 4 performs authentication based on the received storage account information. Specifically, the storage authentication unit 41 determines whether to permit reading of data from the setting area 421. When the storage authentication unit 41 determines that the reading is permitted, the cloud storage 4 transmits the sort setting information 501 stored in the setting area 421 to the information processing system 10 (step S502).

The transfer job execution unit 11 of the information processing system 10 executes the data transfer process 155b. That is, the transfer job execution unit 11 transmits facsimile data to the cloud storage 4 (step S503). Specifically, the transfer job execution unit 11 sorts facsimile data into a folder in accordance with the received sort setting information 501, and transmits the facsimile data to the cloud storage 4 together with information designating the folder into which the facsimile data is sorted.

The sort setting information 501 is an Excel file or the like including tabular data. In response to acquiring the Excel file, the transfer job execution unit 11 (web application) converts the Excel format (tabular format) into the JavaScript Object Notation (JSON) format. Then, the transfer job execution unit 11 uses a fax number, a folder name, and an email address included in the conversion result to store the received facsimile data in the PDF file format in the folder having the folder name corresponding to the transmission source number (fax number) of the facsimile data.

If the folder having the folder name corresponding to the transmission source number (fax number) is not included in the storage location, the transfer job execution unit 11 causes the cloud storage 4 to create a folder having the corresponding folder name. Then, the transfer job execution unit 11 stores the facsimile data in the PDF file format in the created folder.

If the facsimile data is received from a transmission source number not defined in the sort setting information 501, the transfer job execution unit 11 designates a folder name included in the undefined data sorting information, as a storage location into which the facsimile data is sorted.

The transfer job execution unit 11 may transmit information designating the file name used after the transfer, together with the facsimile data. The file name includes, for example, the transmission source name, the transmission date, and the transmission source number. The transfer job execution unit 11 may use the transmission source name, the transmission date, and the transmission source number to change the file name first, and then transmit information designating the changed file name.

The transmission source name is the same as the name of the sort destination folder. The transmission source name may be information included in the metadata of the facsimile data. If facsimile data, for which the transmission source number is not defined in the sort setting information 501, is transferred, the transmission source number may be used instead of the transmission source name.

The storage authentication unit 41 of the cloud storage 4 performs authentication based on the received storage account information. Specifically, the storage authentication unit 41 determines whether to permit writing of data to the data storage area 422. When the storage authentication unit 41 determines that the writing is permitted, the cloud storage 4 stores the received facsimile data in the designated folder of the data storage area 422.

Next, the cloud storage 4 transmits a signal indicating successful data transfer (success signal) to the information processing system 10 (step S504).

In response to receiving the success signal, the transfer job execution unit 11 executes the email transmission process 155c. That is, the transfer job execution unit 11 transmits a notification email, indicating the completion of the data transfer and the sort destination of the facsimile data, to the mail server 7 (step S505). Specifically, the transfer job execution unit 11 transmits a notification email in which the value of the "notification email address" in the sort setting information 501 is designated as a destination. The mail server 7 transmits the received notification email to the designated destination.

The transfer job execution unit 11 updates the transfer status included in the transfer job execution history information 156 stored in the storage unit 15 to "completed".

If an error occurs in any of the above-described processes, the transfer job execution unit 11 updates the transfer status included in the transfer job execution history information 156 stored in the storage unit 15 to "error". Then, the transfer job execution unit 11 executes the error email transmission process 155d. That is, the transfer job execution unit 11 transmits a notification email indicating the occurrence of an error to the email address included in the error notification information.

The notification process in step S505 described above and the error email transmission process are performed via email based on a simple mail transfer protocol (SMTP) or any other suitable protocol. The email address to which an email is transmitted is an example of a "notification destination associated with the data". The notification process may be any other process as long as a user is notified of information related to data transfer. For example, the notification process may be a process for performing notification via telephone, short message service (SMS), facsimile, or social network service (SNS). Alternatively, the information related to data transfer may be displayed as a pop-up dialog or a banner on the screen of the administrator terminal 5, the user terminal 6, or the image forming apparatus 20. In addition, the data transfer system 1 may indicate the information related to data transfer to another server, a cloud service, or the like via an API, and may execute a plurality of processes related thereto.

FIG. 20 is a diagram illustrating an example notification email.

A notification email 701 is an example of a notification email when facsimile data whose transmission source number is defined in the sort setting information 501 is transferred. For example, if the facsimile data is sorted into a folder "ABC", a path name and a file name including "ABC" are included in the body of the notification email.

FIG. 21 is a diagram illustrating another example notification email.

A notification email 702 is an example of a notification email when facsimile data whose transmission source number is not defined in the sort setting information 501 is transferred. For example, if the facsimile data is sorted into a folder "undefined", a path name and a file name including "undefined" is included in the body of the notification email. The destination of the notification email 702 is the email address included in the undefined data sorting information.

Next, a retransmission process performed when facsimile data fails to be transferred will be described with reference to the drawings. Specifically, a retransmission process is performed when facsimile data is successfully transmitted from the image forming apparatus 20 to the information processing system 10, but the facsimile data fails to be transferred from the information processing system 10 to the cloud storage 4.

Note that in addition to the retransmission process, if facsimile data has failed to be transmitted from the image forming apparatus 20 to the information processing system 10 in the first place due to a communication error or the like, the transfer instruction unit 23 may collectively transmit the facsimile data to the information processing system 10. In a real-time transmission process in which each time the image forming apparatus 20 receives facsimile data, the image forming apparatus 20 transmits the facsimile data to the information processing system 10, the transfer instruction unit 23 may also check data that has not been transmitted and data to be retransmitted, and transmit such data.

FIG. 22 is a diagram illustrating an example of queue information.

Queue information 502 according to the present embodiment includes items "queue ID", "process", and "facsimile data ID".

The item "queue ID" has a value representing an identifier for identifying a process registered in the queue.

The item "process" has a value representing the name of a process registered in the queue.

The item "facsimile data ID" has a value representing an identifier for identifying facsimile data to be subjected to a process registered in the queue.

The transfer instruction unit 23 registers, in the queue information 502, the data transfer process for transferring facsimile data and the retransmission process for transmitting facsimile data that has not been transferred. Further, the data deletion unit 27 registers the data deletion process in the queue information 502 when the data deletion function is enabled.

When the transfer instruction unit 23 registers the data transfer process in the queue information 502, the transfer instruction unit 23 identifies facsimile data to be transferred. The facsimile data to be transferred is facsimile data received from the facsimile 2.

The transfer instruction unit 23 registers the retransmission process in the queue information 502 periodically, for example, every hour. When the transfer instruction unit 23 registers the retransmission process in the queue information 502, facsimile data to be retransmitted has yet to be identified. The transfer instruction unit 23 identifies facsimile data to be retransmitted when executing the retransmission process. Therefore, in the queue information 502, no value is registered in the "facsimile data ID" of facsimile data to be subjected to the retransmission process.

The data deletion unit 27 registers the data deletion process in the queue information 502 periodically, for example, once a day when the data deletion function is enabled. When the data deletion unit 27 registers the data deletion process in the queue information 502, facsimile data to be deleted has yet to be identified. The data deletion unit 27 identifies facsimile data to be deleted when executing the data deletion process. Therefore, in the queue information 502, no value is registered in the "facsimile data ID" of facsimile data to be subjected to the data deletion process.

Next, a sequence of a retransmission process will be described with reference to the drawings.

Figure 23:
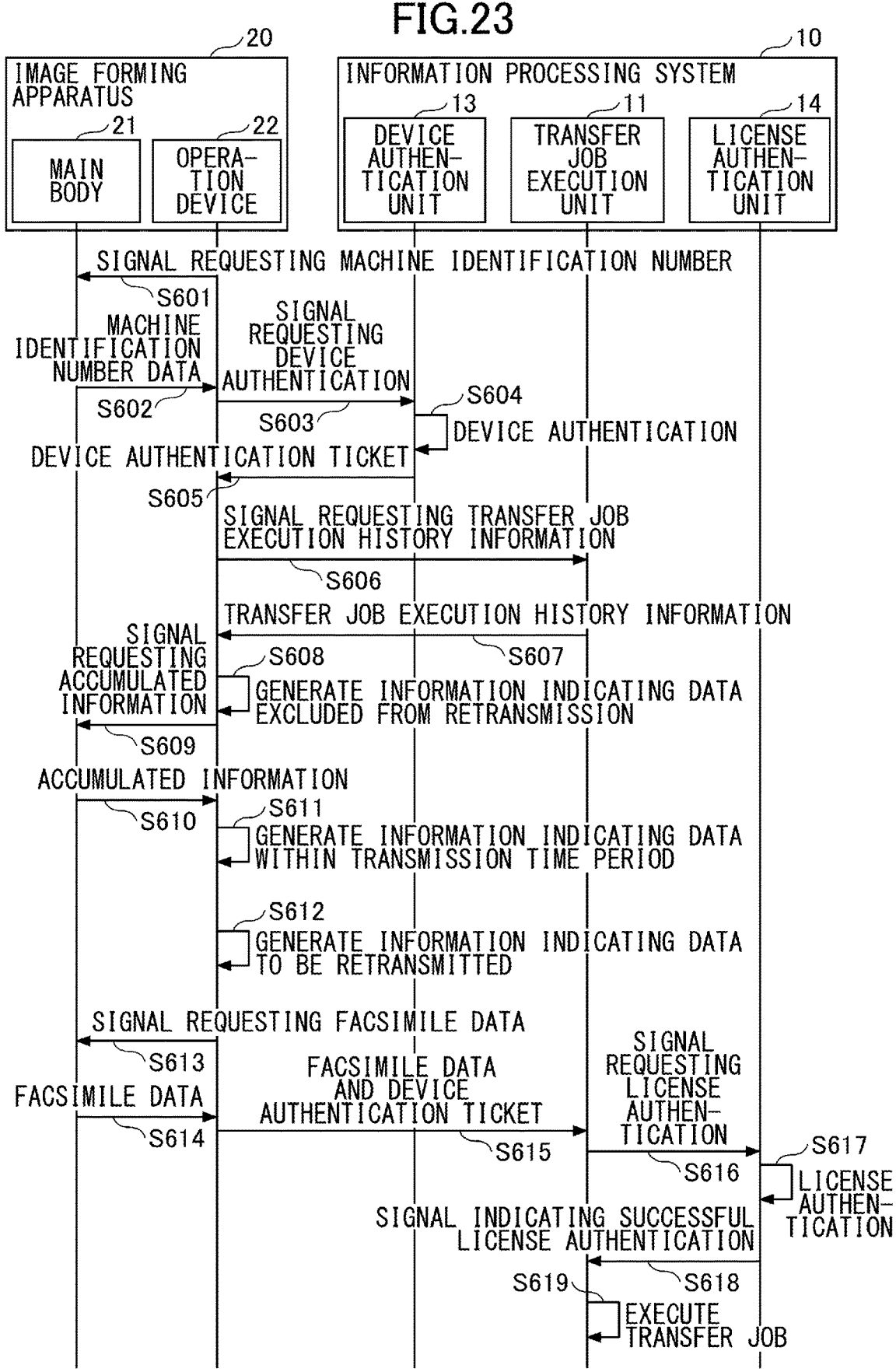
FIG. 23 is a diagram illustrating an example sequence of a retransmission process.

FIG. 23 is a diagram illustrating an example sequence of the retransmission process.

The transfer instruction unit 23 of the operation device 22 executes processes registered in the queue information 502 according to the order of registration. At the turn for the retransmission process, the transfer instruction unit 23 starts the retransmission process illustrated in FIG. 23.

When the retransmission process is started, the transfer instruction unit 23 transmits a signal requesting the machine identification number of the image forming apparatus 20 to the main body 21 (step S601). The main body 21 transmits data indicating the machine identification number to the operation device 22 (step S602).

Next, the transfer instruction unit 23 of the operation device 22 transmits a signal requesting device authentication to the information processing system 10 (step S603). The device authentication unit 13 of the information processing system 10 performs device authentication (step S604). When the device authentication is successful, the device authentication unit 13 issues a device authentication ticket and transmits the device authentication ticket to the image forming apparatus 20 (step S605).

In the subsequent processes, when transmitting a signal requesting a process to the information processing system 10, the transfer instruction unit 23 also transmits the device authentication ticket. This enables the information processing system 10 to confirm that the image forming apparatus 20 has been authenticated.

Next, the transfer instruction unit 23 of the operation device 22 transmits a signal requesting the transfer job execution history information 156 to the information processing system (step S606). The transfer job execution unit 11 of the information processing system 10 transmits the transfer job execution history information 156 stored in the storage unit 15 to the image forming apparatus 20 (step S607).

FIG. 24 is a diagram illustrating an example of the transfer job execution history information.

The transfer job execution history information 156 is information indicating a history of execution of transfer jobs, and includes items "job ID", "machine identification number", "facsimile data ID", and "transfer status".

The item "job ID" has a value representing an identifier for identifying a transfer job. Each time a transfer job is started, the transfer job execution unit 11 assigns a job ID to the transfer job.

The item "machine identification number" has a value representing an identifier for identifying a device (apparatus) that has requested the transfer job. The item "machine identification number" is used to receive requests from a plurality of devices (apparatuses).

The item "facsimile data ID" has a value representing an identifier assigned to a series of pieces of facsimile data received in a single facsimile reception operation, and is configured to identify each series of facsimile data.

The item "transfer status" has a value indicating the execution status of the transfer job. Specifically, the item "transfer status" has any one of the values "accepted", "processing", "completed", and "error".

When a certain period of time, for example, three months or more, elapses after a record is registered in the transfer job execution history information 156, the transfer job execution unit 11 may delete the record.

In step S607 illustrated in FIG. 23, from within the transfer job execution history information 156, the transfer job execution unit 11 extracts the record of the machine identification number corresponding to the device (apparatus) from which the request has been received, and transmits the extracted record to the image forming apparatus 20.

Referring back to FIG. 23, the transfer instruction unit 23 of the operation device 22 stores the received transfer job execution history information 156 in the RAM 223, and generates, based on the stored transfer job execution history information 156, information indicating data excluded from retransmission (step S608). The information indicating data excluded from retransmission is information indicating facsimile data excluded from the retransmission process.

Figure 25:
FIG. 25 is a diagram illustrating an example of information indicating data excluded from retransmission.

FIG. 25 is a diagram illustrating an example of information indicating data excluded from retransmission.

The transfer instruction unit 23 extracts records whose transfer statuses are set to "accepted", "processing", and "completed" from the received transfer job execution history information 156, and stores the extracted records in the RAM 223 as information 504 indicating data excluded from retransmission.

Facsimile data associated with the records of the above transfer statuses have already been transferred or are scheduled to be transferred in a future data transfer process, and thus are excluded from the retransmission process.

Referring back to FIG. 23, the transfer instruction unit 23 of the operation device 22 transmits a signal requesting the accumulated information 509 to the main body 21 (step S609).

The main body 21 extracts the accumulated information 509 from the storage unit 26, and transmits the extracted accumulated information 509 to the operation device 22 (step S610).

Next, the transfer instruction unit 23 of the operation device 22 stores the received accumulated information 509 in the RAM 223, and generates information indicating data within a transmission time period based on the accumulated information 509 (step S611). The information indicating data within a transmission time period is information indicating facsimile data within a transmission time period of the retransmission process.

FIG. 26 is a diagram illustrating an example of information indicating data within a transmission time period.

The transfer instruction unit 23 extracts records of facsimile data received in a predetermined transmission time period, for example, 14 days, from the accumulated information 509, and stores the extracted records as information 505 indicating data within the transmission period of time.

Referring back to FIG. 23, the transfer instruction unit 23 of the operation device 22 generates information indicating data to be retransmitted, and stores the information indicating data to be retransmitted in the RAM 223 (step S612). The information indicating data to be retransmitted is information indicating facsimile data to be subjected to the retransmission process. That is, the transfer instruction unit 23 generates information indicating data to be retransmitted based on the acquired transfer job execution history information 156, so as to identify facsimile data to be retransmitted from among the facsimile data stored in the storage unit 26 based on the information indicating data to be retransmitted. Accordingly, the identified facsimile data can be retransmitted to the information processing system 10.

FIG. 27 is a diagram illustrating an example of information indicating data to be retransmitted.

Specifically, the transfer instruction unit 23 removes the facsimile data in the information 504 indicating data excluded from retransmission stored in the RAM 223 from the information 505 indicating data within the transmission period of time stored in the RAM 223, and stores the remaining facsimile data in the RAM 223 as information 506 indicating data to be retransmitted. For example, the information 505 indicating data within the transmission period of time includes records of facsimile data IDs "0000001" to "0000016", and the information 504 indicating data excluded from retransmission includes records of facsimile data IDs "0000001" to "0000008", "0000010", "0000011", "0000013", and "0000014". In this case, the information 506 indicating data to be retransmitted includes records of facsimile data IDs "0000009", "0000012", "0000015", and "0000016".

Referring back to FIG. 23, the transfer instruction unit 23 of the operation device 22 transmits a signal requesting facsimile data included in the information 506 indicating data to be retransmitted stored in the RAM 223 to the main body 21 (step S613).

If the information 506 indicating data to be retransmitted includes a plurality of pieces of facsimile data, the data transfer system 1 repeatedly executes steps S613 through S619 on each piece of facsimile data.

The main body 21 transmits facsimile data to the operation device 22 (step S614).

The transfer instruction unit 23 of the operation device 22 transmits the facsimile data together with the device authentication ticket to the information processing system 10 (step S615). The transfer job execution unit 11 transmits a signal requesting license authentication to the license authentication unit 14 (step S616).

The license authentication unit 14 executes license authentication (step S617). Specifically, the license authentication unit 14 identifies the machine identification number based on the device authentication ticket, and determines whether the device (apparatus) corresponding to the machine identification number is assigned to the license of the tenant corresponding to the machine identification number. As a result, the license authentication unit 14 can determine whether the data transfer function is enabled.

The license authentication unit 14 may determine whether the corresponding license is within the validity period.

When the license authentication is successful, the license authentication unit 14 transmits a signal indicating successful license authentication to the transfer job execution unit 11 (step S618).

Next, the transfer job execution unit 11 executes a transfer job specified in the transfer job definition information 155 (step S619).

The retransmission process illustrated in FIG. 23 can retransmit any facsimile data that has failed to be transferred. Accordingly, the reliability of the transfer of facsimile data can be increased. For example, in a transaction such as order reception, missing orders, duplicate orders, or other issues can be prevented. Note that data to be transferred or transmitted is not limited to facsimile data, and may be other image data, files, or emails, which can be applied to various data transfer scenarios.

Note that there may be a possibility that facsimile data, which has already been transmitted in the data transfer process illustrated in FIG. 16, may be retransmitted in the above-described retransmission process. Therefore, the transfer instruction unit 23 may transfer data after confirming that the data is not to be subjected to the above-described retransmission process.

Specifically, the transfer instruction unit 23 of the operation device 22 executes a process below before step S401 of the data transfer process.

The transfer instruction unit 23 transmits a signal requesting the transfer job execution history information 156 to the information processing system 10. The transfer job execution unit 11 of the information processing system 10 transmits the transfer job execution history information 156 to the image forming apparatus 20. The transfer instruction unit 23 stores the received transfer job execution history information 156 in the RAM 223, extracts records whose transfer statuses are set to "accepted", "processing", and "completed" from the transfer job execution history information 156, and stores the extracted records in the RAM 223.

Then, the transfer instruction unit 23 compares and determines whether facsimile data to be transferred is included in the extracted records stored in the RAM 223. If the transfer instruction unit 23 determines that the facsimile data to be transferred is included in the extracted records, the transfer instruction unit 23 ends the data transfer process because the facsimile data has already been transmitted.

If the transfer instruction unit 23 determines that the facsimile data to be transferred is not included in the extracted records, the transfer instruction unit 23 executes step S401 and the subsequent steps.

Accordingly, the data transfer system 1 can prevent facsimile data, which has been just registered in the accumulated information 509 of the image forming apparatus 20, but has not been registered in the transfer job execution history information 156 of the information processing system 10, from being retransmitted in the data retransmission process, after being transmitted in the data transfer process. This can reduce the risk of double transmission of facsimile data.

In the data transfer system 1 according to the present embodiment, specific facsimile data is not required to be transferred. For example, for facsimile data whose content can be accessed upon the image forming apparatus 20 receiving an input of a personal identification number, the facsimile data may potentially be accessed without the input of the personal identification number when transferred, and thus is not required to be transferred.

Next, the data deletion process for deleting facsimile data accumulated in the image forming apparatus 20 will be described.

The data deletion function of the image forming apparatus 20 is disabled in the initial state or immediately after a data deletion application is installed. The tenant administrator 9 performs an operation to enable the data deletion function on a screen for operating the operation device 22. Specifically, if the data transfer function illustrated in FIG. 5 is enabled, the operation device 22 displays a data deletion function setting input screen in response to the operation by the tenant administrator 9.

Figure 28:
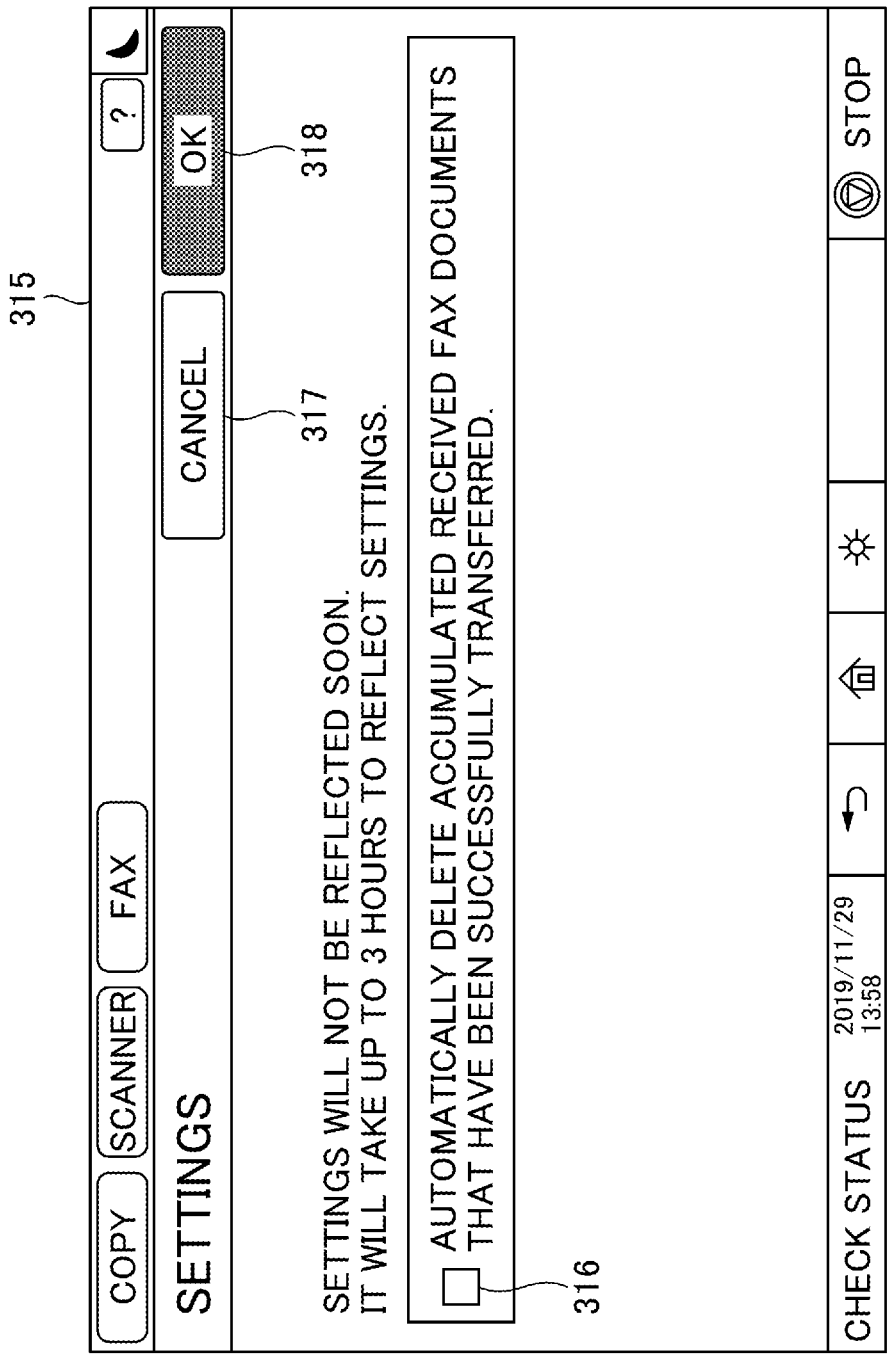
FIG. 28 is a diagram illustrating an example of a data deletion function setting input screen.

FIG. 28 is a diagram illustrating an example of a data deletion function setting input screen.

A data deletion function setting input screen 315 includes a checkbox 316 for enabling the data deletion function, a cancel button 317, and an OK button 318.

The checkbox 316 for enabling the data deletion function is a GUI for selecting whether to enable the data deletion function.

The cancel button 317 is a button for canceling the settings of the data deletion function. In response to the cancel button 317 being pressed, the operation device 22 ends the process without changing the settings.

The OK button 318 is a button for registering the settings of the data deletion function. In response to the OK button 318 being pressed, the operation device 22 stores the settings selected by checking the checkbox 316 and displays a data deletion function setting confirmation screen.

Figure 29:
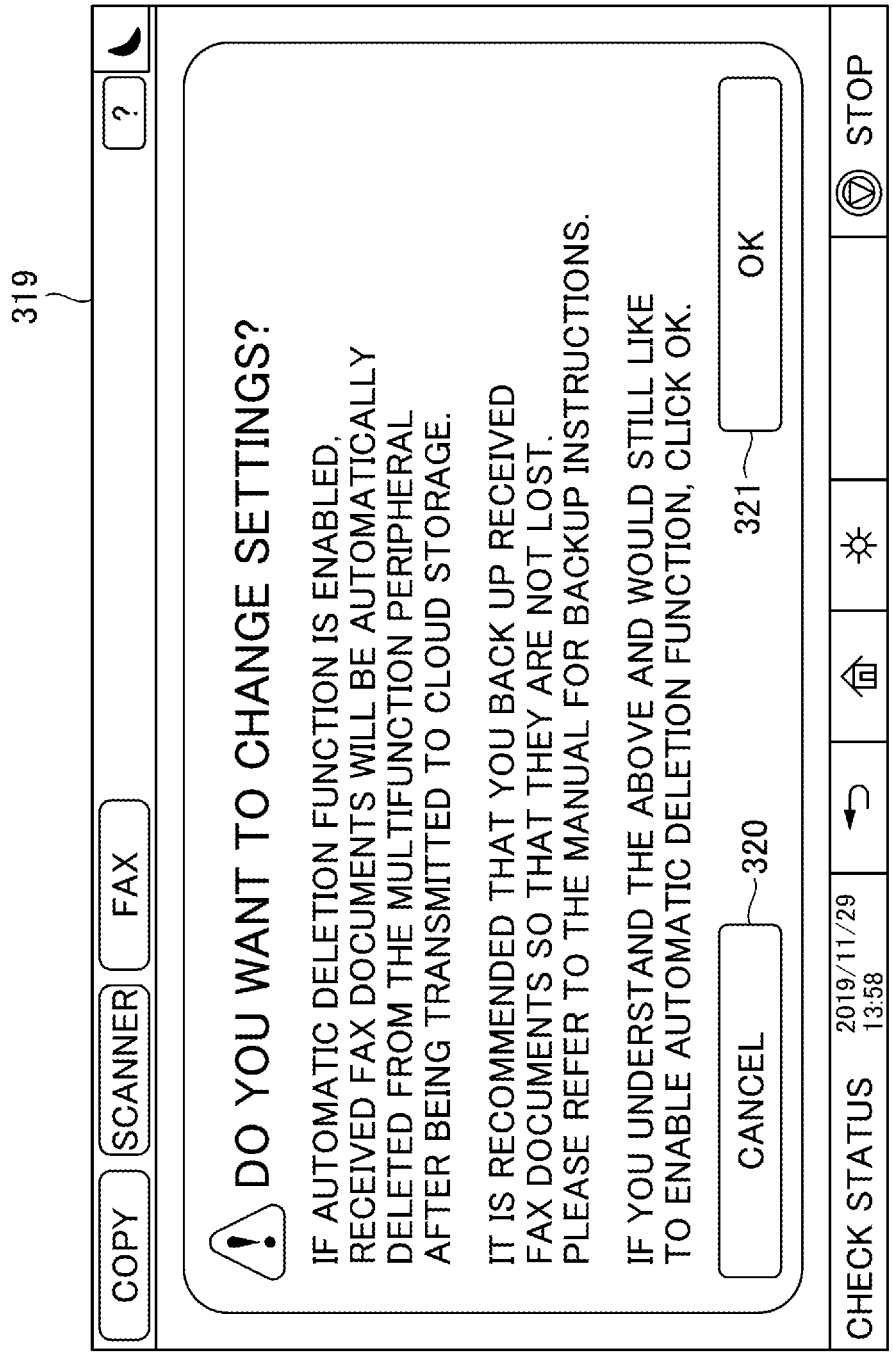
FIG. 29 is a diagram illustrating an example of a data deletion function setting confirmation screen.

FIG. 29 is a diagram illustrating an example of a data deletion function setting confirmation screen.

A data deletion function setting confirmation screen 319 includes a cancel button 320 and an OK button 321.

The cancel button 320 is a button for canceling the settings of the data deletion function. In response to the cancel button 320 being pressed, the operation device 22 ends the process without changing the settings.

The OK button 321 is a button for registering the settings of the data deletion function. In response to the OK button 321 being pressed, the operation device 22 updates setting information stored in the data deletion unit 27 in accordance with the settings selected by checking the checkbox 316, which are stored in the storage unit 26.

The setting information stored in the data deletion unit 27 includes information indicating whether the data deletion function is enabled or disabled, and information indicating the date and time when the data deletion function is enabled.

The data deletion function setting confirmation screen 319 may include a message that prompts data backup.

Next, the data deletion process will be described with reference to the drawings.

The operation device 22 executes processes registered in the queue information 502 according to the order of registration. At the turn for the data deletion process, the data deletion unit 27 starts the data deletion process illustrated in FIG. 30.

Figure 30:
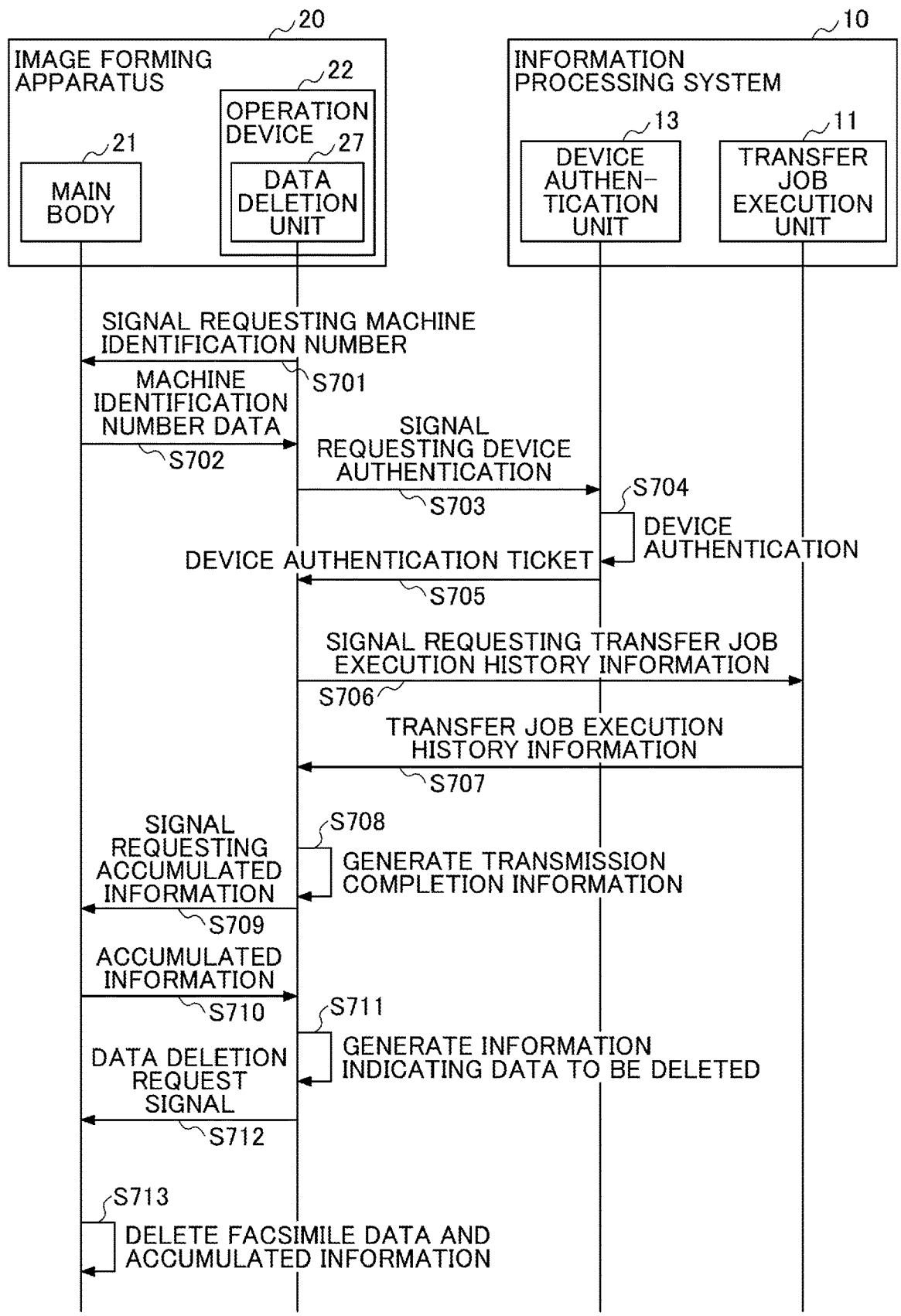
FIG. 30 is a diagram illustrating an example sequence of a data deletion process.

FIG. 30 is a diagram illustrating an example sequence of the data deletion process.

When the data deletion process is started, the data deletion unit 27 transmits a signal requesting the machine identification number of the image forming apparatus 20 to the main body 21 (step S701). The main body 21 transmits data indicating the machine identification number to the operation device 22, and the operation device 22 stores the data indicating the machine identification number in the RAM 223 (step S702).

Next, the data deletion unit 27 of the operation device 22 transmits a signal requesting device authentication to the information processing system 10 (step S703). The device authentication unit 13 of the information processing system 10 performs device authentication (step S704). When the device authentication is successful, the device authentication unit 13 issues a device authentication ticket, and transmits the device authentication ticket to the image forming apparatus (step S705).

In the subsequent processes, when transmitting a signal requesting a process to the information processing system 10, the data deletion unit 27 also transmits the device authentication ticket. This enables the information processing system 10 to confirm that the image forming apparatus 20 has been authenticated.

Next, the data deletion unit 27 of the operation device 22 transmits a signal requesting the transfer job execution history information 156 to the information processing system 10 (step S706). The transfer job execution unit 11 of the information processing system 10 transmits the transfer job execution history information 156 to the image forming apparatus 20, and the image forming apparatus 20 stores the transfer job execution history information 156 in the RAM 223 (step S707).

The data deletion unit 27 of the operation device 22 generates transmission completion information based on the received transfer job execution history information 156, and stores the transmission completion information in the RAM 223 (step S708).

Figure 31:
FIG. 31 is a diagram illustrating an example of transmission completion information.

FIG. 31 is a diagram illustrating an example of transmission completion information.

The data deletion unit 27 extracts records whose transfer statuses are set to "completed" from the received transfer job execution history information 156, and stores the extracted records in the RAM 223 as transmission completion information 508.

Referring back to FIG. 30, the data deletion unit 27 of the operation device 22 transmits a signal requesting accumulated information to the main body 21 (step S709).

Figure 32:
FIG. 32 is a second diagram illustrating an example of accumulated information.

FIG. 32 is a second diagram illustrating an example of accumulated information.

Accumulated information 509 includes, for example, a record, such as a facsimile data ID "0000009", that was not deleted in the previous data deletion process because the transfer status in the transfer job execution history information 156 was not "completed", and a record, such as a facsimile data ID "0000012", that was not registered in the previous data deletion process.

If a transmission source number (fax number) is withheld, the field for the transmission source number is blank in the accumulated information 509. In this case, transferred facsimile data is stored in an undefined data storage folder in the cloud storage 4 based on the undefined data sorting information.

Referring back to FIG. 30, the main body 21 extracts the accumulated information 509 from the storage unit 26, and transmits the extracted accumulated information 509 to the operation device 22 (step S710).

Next, the data deletion unit 27 of the operation device 22 generates information indicating data to be deleted based on the received accumulated information 509 (step S711). The information indicating data to be deleted is information indicating facsimile data to be subjected to the data deletion process.

FIG. 33 is a diagram illustrating an example of information indicating data to be deleted.

The data deletion unit 27 extracts records of facsimile data, already transmitted and included in the transmission completion information 508, from the accumulated information 509. Then, the data deletion unit 27 stores, in the storage unit 15, the machine identification numbers and facsimile data IDs of the extracted records as information 510 indicating data to be deleted.

Note that the data deletion unit 27 may exclude facsimile data received before the data deletion function is enabled from the data deletion process, from among the records in the accumulated information 509. Specifically, the data deletion unit 27 acquires information indicating the date and time (A) when the data deletion function is enabled from the stored setting information, and compares the date and time (A) with the date and time (B) received (time received) included in the accumulated information 509. Then, the data deletion unit 27 extracts, from the accumulated information 509, any record that satisfies A<B (record whose date and time (B) is later than the date and time (A)) and that is included in the transmission completion information 508.

A record may be extracted from the accumulated information 509 in accordance with any other date and time condition. For example, the data deletion unit 27 may store the date and time when the data deletion application is installed, the date and time when the contract comes into effect, or the like, and extract a record of facsimile data received after the stored date and time.

Referring back to FIG. 30, the data deletion unit 27 transmits a data deletion request signal including the information 510 indicating the data to be deleted to the main body 21 (step S712).

The main body 21 deletes the facsimile data indicated by the information 510 and the corresponding records in the accumulated information 509 (step S713).

In various processes in which a machine identification number is transmitted, an authentication ticket associated with the machine identification number may be received from the information processing system 10, and the received authentication ticket may be transmitted instead of the machine identification number.

Figure 34:
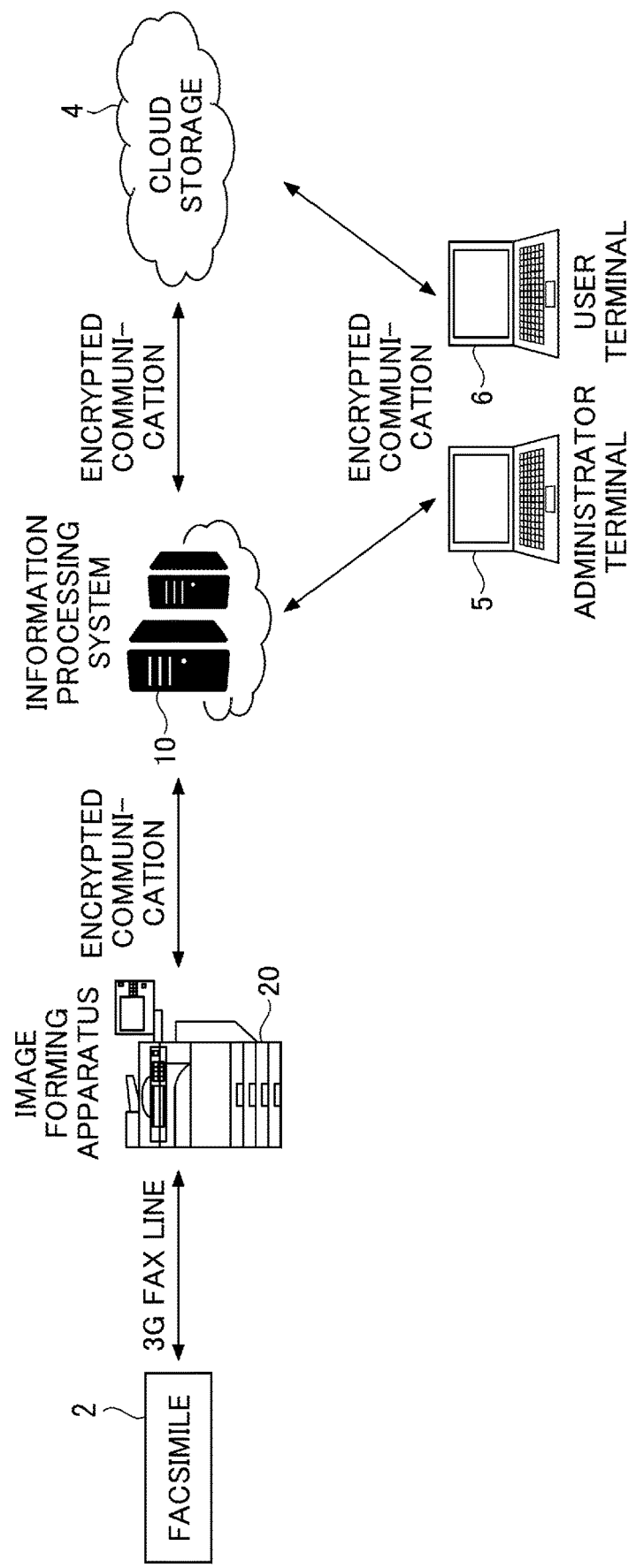
FIG. 34 is a diagram illustrating an example communication method between apparatuses.

FIG. 34 is a diagram illustrating an example communication method between apparatuses.

As illustrated in FIG. 34, apparatuses among the apparatuses illustrated in FIG. 1, namely, the device or apparatus (such as the image forming apparatus 20), the information processing system 10, the cloud storage 4, the administrator terminal 5, and the user terminal 6, communicate with each other in encrypted form. This ensures security. Specifically, after the image forming apparatus 20 in the above-described embodiments receives facsimile data from the facsimile 2 via a third-generation (3G) fax line (such as step S301 in FIG. 14), communication between such apparatuses is performed using an encrypted communication method (for example, Hypertext Transfer Protocol Secure (HTTPS)).

For example, the following communication is encrypted using an encryption communication method:

(a) communication between the image forming apparatus 20 and the information processing system 10 in response to the receipt of facsimile data, that is, communication for starting connection and performing authentication (such as steps S403 and S405 in FIG. 16), communication performed by the image forming apparatus 20 to acquire the transfer job execution history information 156 (such as steps S606 and S607 in FIG. 23), and transmission of data such as facsimile data (such as step S408 in FIG. 16);

(b) transfer of data from the information processing system 10 to the cloud storage 4 (such as steps S502 and S503 in FIG. 19);

(c) communication for transfer setting between the administrator terminal 5 and the information processing system 10 or the cloud storage 4 (FIG. 10);

(d) communication from the user terminal 6 to the cloud storage 4 to access transferred facsimile data; and (e) communication between servers or between modules in the information processing system 10 (such as steps S409 through S411 in FIG. 16).

The series of data transfer processes is implemented by a combination of the encrypted communication described above and communication within the image forming apparatus 20, that is, communication between the main body 21 and the operation device 22 using an API (such as step S303 in FIG. 14, step S401 in FIG. 16, and step S610 in FIG. 23).

For example, the operation of the main body 21 in the retransmission process illustrated in FIG. 23 may be performed by the API included in the main body 21. Accordingly, even if communication is performed via an external network such as the Internet during the series of data transfer processes, leakage of data can be prevented as a whole, and security can be improved. To be more specific, with the use of HTTPS as an encrypted communication method, a handshake with the connection destination via transmission control protocol (TCP) communication is performed separately from encryption of the content to be communicated via Secure Sockets Layer (SSL) communication and verification of the connection destination using the mutual certificate in the series of communication activities described above.

In SSL communication, based on the SSL certificate of the connection-destination device, the connection-source device verifies the validity of the certificate and the identity of the host name to verify whether the connection destination is correct. Therefore, in data transfer across the device (such as the image forming apparatus 20), the information processing system 10, the cloud storage 4, and the like, it is possible to guarantee the validity of the connection destination and prevent a man-in-the-middle attack in which a malicious third party is placed into the communication path and intercepts communication.

Furthermore, the data transfer system 1 combines some or all of the embodiments described above and the communication methods described above. Accordingly, the data transfer system 1 provides direct communication between the device (the image forming apparatus 20) and the information processing system 10 and between the information processing system 10 and the cloud storage 4 using HTTPS communication including TCP and SSL. In the data transfer system 1, data transfer states or processing states are collectively recorded and accumulated in the storage unit 15 of the information processing system 10 as the transfer job execution history information 156.

This provides traceability of data transfer from the device to the cloud storage via the information processing system 10. The transfer job execution history information 156 is utilized on the device side, thereby preventing or reducing critical errors related to missing information errors such as double transmission, non-transmission, and erroneous deletion of data.

Furthermore, in the information processing system 10, in order to enable the transfer function at the time of initial activation of the device (the image forming apparatus 20) using the application (steps S101 through S110 in FIG. 5), the device is authenticated using the machine identification number (the serial number of the device) after the administrator is logged in. In the data transfer system 1, the information processing system 10 uses encrypted communication to perform device authentication for each data transfer (steps S401 through S411 in FIG. 16). Accordingly, it is possible to prevent tampering or leakage of data transmitted from the device, and further prevent spoofing from any other device.

Additionally, authentication settings for access from the information processing system 10 to the cloud storage 4 are configured in advance (step S209 in FIG. 10). In addition, device authentication for each data transfer is automatically performed based on the initial registration (such as the device authentication process in step S404 and the license authentication process in step S410 in FIG. 16). Accordingly, the user is not required to frequently input authentication information, thereby improving usability.

As described above, it is possible to achieve (a) concealment of information and a path via encrypted communication, and guarantee of validity of the communication destination, (b) avoidance of loss of transfer data, and a safe solution in which tampering and spoofing are suppressed, and (c) improved usability.

In the data transfer system 1 according to the above-described embodiments, facsimile data, whose transfer job is successfully completed, can be deleted from among facsimile data accumulated in the image forming apparatus 20. Therefore, received data can be appropriately deleted, and an increase in the capacity of the storage unit 26 used can be suppressed.

If the data transfer process 155b is successfully completed and the email transmission process 155c fails in a transfer job of facsimile data, the transfer status is set to "error" in the transfer job execution history information 156. In such a case, the main body 21 does not delete the facsimile data and the corresponding record in the accumulated information 509.

In other words, when the transfer job execution history information 156 indicates that both the first process (data transfer process 155b) and the second process (email transmission process 155c) are successfully completed, the data deletion unit 27 deletes data from the storage unit 26. Accordingly, it is possible to prevent data from being deleted at an inappropriate timing without sending an email notification to a transfer destination. In other words, data can be deleted at an appropriate timing after an email notification is sent to a transfer destination.

The second process is not limited to a process for sending a notification to a transfer destination, and may be any process related to the first process. For example, the second process may be a process for causing the information processing system 10, any other server, a cloud service, or the like to execute a certain process via an API, or may be a combination of a notification process and the certain process. Because the second process is related to the first process, the second process is expected to be completed together with the first process. Therefore, if data is deleted without the second process being completed, a problem may occur. That is, the timing when both the first process and the second process are completed may be the appropriate timing to delete data.

In the data transfer system 1 according to the present invention, data is retransmitted only when the transfer job is not completed. Therefore, the entire transfer job including a series of processes can be completed. Further, data is deleted only when the transfer job is completed. Therefore, the data is not deleted until the entire transfer job including a series of processes is completed.

In the data transfer system 1 according to the embodiments, data is deleted when a value indicates that the information processing system 10 has received a signal, indicating successful transfer of the data, from the transfer destination (the cloud storage 4) in the first process (data transfer process 155b) and also that the second process (email transmission process 155c) has been completed. Accordingly, the data can be deleted only when it is guaranteed that the data has been transferred to the transfer destination and the transfer job has been completed.

Further, the data deletion unit 27 does not delete data received before the data deletion function is enabled. This can prevent unintended, erroneous deletion of data.

Further, the information processing system 10 and the image forming apparatus 20 can be configured to share the described processing steps, for example, the processing steps of the sequences described in FIG. 5, FIG. 10, FIG. 14, FIG. 16, FIG. 19, FIG. 23, and FIG. 30, in various combinations. Further, the components of the information processing system 10 and the image forming apparatus 20 may be integrated into one server apparatus or divided into a plurality of apparatuses.

In the embodiments described above, an example in which facsimile data is transferred has been described; however, the present invention is not limited thereto, and is applicable to a system that transfers various types of data such as emails and files. For example, data scanned by the image forming apparatus 20, facsimile data scheduled to be transmitted from the image forming apparatus 20, image data received by the image forming apparatus 20 together with a print instruction, data generated by an application installed in the image forming apparatus 20, or the like may be transferred.

That is, data to be transferred is not limited to image data, and may be any data in a file format such as an image file, a text file, a setup file, a document file, a binary data file created by various applications, or a file for holding setting information of an application. Alternatively, data to be transferred may be any data in a format other than a file format.

In addition, a system including a device (an apparatus) having the function of the transfer job execution unit 11 or the setting registration unit 12 and configured to transmit or transfer data directly to the cloud storage 4 may be used. In this case, the device receives a signal indicating successful data transfer (similar to that in step S504 illustrated in FIG. 19) from the cloud storage 4, and generates the transfer job execution history information 156. Then, the device may store the generated transfer job execution history information 156 in a storage unit (such as the RAM 223, the flash memory 224, or the storage 214), and compare the transfer job execution history information 156 with accumulated information of the device. In this manner, the retransmission process, the data deletion process, or the like may be performed.

Further, the device may directly transfer data to one or more cloud storages 4. For example, as in step S209 illustrated in FIG. 10, the tenant administrator 9 may input account information, a reference folder, and the like in the cloud storage 4. Then, as in step S502 illustrated in FIG. 19, the device may acquire the sort setting information 501 stored in the cloud storage 4, and execute data transfer in accordance with the acquired sort setting information 501.

The cloud storage 4 is an example of a storage configured to store data. The storage may not be a cloud storage, and may be implemented by a single apparatus or a plurality of apparatuses.

When there is a plurality of cloud storages 4 as transmission destinations, and the cloud storages 4 have different specifications, the transfer job definition information 155 may be defined for each of the cloud storages 4. Accordingly, data can be deleted when a transfer process including related processes such as a notification process is completed.

Further, the transfer job definition information 155 may be defined to be transmitted to a plurality of cloud storages 4 in a single transfer job. Accordingly, data can be deleted when a transfer process to all of the cloud storages 4 in the single transfer job, including related processes such as a notification process, is completed. Further, the transfer job definition information 155 may be defined to be transmitted to the same cloud storage 4 a plurality of times in a single transfer job. For example, the transfer job definition information 155 may be defined to be transmitted to a folder F1 in the cloud storage 4 in the first transmission process, and transmitted to a folder F2 in the cloud storage 4 in the second transmission process. Accordingly, data can be deleted from the transfer source after the completion of a transfer process including data backup.

In the above-described embodiments, an example in which the data transfer system 1 registers the data deletion process in the queue information 502, and executes the data deletion process independently of the retransmission process has been described. However, the data transfer system 1 may execute the data deletion process concurrently with the retransmission process. Specifically, when the transfer instruction unit 23 transmits a transfer instruction in step S615 after step S614 of the retransmission process illustrated in FIG. 23, the data deletion unit 27 executes the data deletion process in an asynchronous manner without waiting for a response to the transfer instruction. Then, the data deletion unit 27 executes step S708 and the subsequent steps illustrated in FIG. 30. In this manner, the data deletion unit 27 is not required to execute steps S701 to S707, and the number of communications with the information processing system 10 can be reduced.

The group of apparatuses described in the above-described embodiments is merely representative of one of a plurality of computing environments for implementing the embodiments described herein. In one embodiment, the information processing system 10 includes a plurality of computing devices such as a server cluster. The plurality of computing devices may be configured to communicate with each other via any type of communication link including a network, a shared memory, and so on, and may perform the processes described herein. Likewise, the image forming apparatus 20 may include a plurality of computing devices configured to communicate with each other.

Each of the functions of the above-described embodiments may be implemented by one or more processing circuitries. As used herein, the term "processing circuitry" includes a device such as a processor programmed to cause software to execute the functions, such as a processor implemented by an electronic circuitry, and an application-specific integrated circuit (ASIC), a digital signal processor (DSP), a field-programmable gate array (FPGA), and a circuit module designed to execute the above-described functions.

Further, in the above-described embodiments, the image forming apparatus 20 has been described as an example of a device (apparatus) configured to receive data. However, the device (apparatus) is not limited to the image forming apparatus, and may be any apparatus having a communication function. The device (apparatus) may be, for example, a projector (PJ), an output device such as digital signage, a teleconferencing device, a head-up display (HUD) device, an industrial machine, a medical device, a network home appliance, an automobile (a connected car), a notebook PC, a mobile phone, a tablet terminal, a game console, a personal digital assistant (PDA), a digital camera, a spherical panoramic image capturing device, a wearable PC, a desktop PC, or the like.

An application program installed in the image forming apparatus 20 may be installed in an information processing apparatus such as a PC, a mobile terminal, or a smartphone of the user. That is, the operation device 22 described above may be included in an apparatus other than an image forming apparatus 20.

Although the present invention has been described based on above-described embodiments, the present invention is not limited to the above-described embodiments. The embodiments may be modified without departing from the scope of the present invention, and may be appropriately defined according to the application forms.

What is claimed is:

1. An apparatus comprising: a memory; and a processor coupled to the memory and configured to store data in the memory, transmit the data stored in the memory to an information processing system, instruct the information processing system to execute a transfer job that includes a first process of transferring the data, and a second process related to the first process, the second process including sending information related to transfer of the data to a first notification destination indicated by the transfer job, and delete the data from the memory in a case where transfer job execution history information indicates that the first process and the second process are completed, the transfer job execution history information including a history of execution of the transfer job, wherein the transfer job further includes: an error notification transmission process that is executed in a case where the transfer job execution history information indicates that an error has occurred in any of the first process or the second process, the error notification transmission process including transmission of a notification indicating the occurrence of the error to a second notification destination associated with the data.

2. The apparatus according to claim 1, wherein the notification destination is an email address, and the second process includes transmitting an email to the email address.

3. The apparatus according to claim 1, wherein the second process includes causing the information processing system to execute a process related to the first process.

4. The apparatus according to claim 1, wherein the processor is configured to determine whether the transfer job execution history information indicates that the first process and the second process are completed, based on whether a value of a transfer status included in the transfer job execution history information indicates that the transfer job has been successfully completed.

5. The apparatus according to claim 4, wherein the value indicating that the transfer job has been successfully completed indicates that the information processing system has received a signal from a transfer destination in the first process and that the second process has been completed, the signal indicating successful transfer of the data.

6. The apparatus according to claim 1, wherein the processor is configured to identify, based on the transfer job execution history information, data to be transmitted from among pieces of data stored in the memory, and transmit the identified data to the information processing system.

7. The apparatus according to claim 6, wherein a transfer status included in the transfer job execution history information has any one of a value indicating that a transfer instruction has been accepted by the information processing system, a value indicating that the transfer job is being executed, a value indicating that the transfer job has been successfully completed, and a value indicating that the transfer job has been abnormally terminated, and the processor is configured to identify data whose transfer status has none of: the value indicating that the transfer instruction has been accepted, the value indicating that the transfer job is being executed, and the value indicating that the transfer job has been successfully completed, as the data to be transmitted from among the pieces of data stored in the memory.

8. The apparatus according to claim 1, wherein the processor is configured to register processes including a deletion process and a transfer process in queue information, and execute the processes registered in the queue information according to an order, the queue information including the processes in a queue.

9. The apparatus according to claim 1, wherein the processor is configured to receive a selection as to whether to enable a data deletion function, and delete, from the memory, data that is received after a date and time when the data deletion function is enabled.

10. A data transfer system comprising: an apparatus including a first memory, and a first processor; and an information processing system including a second memory, and a second processor, wherein the first processor is configured to store data in the first memory, transmit the data stored in the memory to the information processing system, instruct the information processing system to execute a transfer job that includes a first process of transferring the data, and a second process related to the first process, the second process including sending information related to transfer of the data to a notification destination indicated by the transfer job, and delete the data from the memory in a case where transfer job execution history information indicates that the first process and the second process are completed, the transfer job execution history information including a history of execution of the transfer job, and wherein the second processor is configured to execute the transfer job in response to receiving an instruction to execute the transfer job, and update the transfer job execution history information in accordance with an execution status of the transfer job, wherein the transfer job further includes: an error notification transmission process that is executed in a case where the transfer job execution history information indicates that an error has occurred in any of the first process or the second process, the error notification transmission process including transmission of a notification indicating the occurrence of the error to a second notification destination associated with the data.

11. A data deletion method performed by a computer, the method comprising: storing data in a memory; transmitting the data stored in the memory to an information processing system; instructing the information processing system to execute a transfer job that includes a first process of transferring the data, and a second process related to the first process the second process including sending information related to transfer of the data to a notification destination indicated by the transfer job; and deleting the data from the memory in a case where transfer job execution history information indicates that the first process and the second process are completed, the transfer job execution history information including a history of execution of the transfer job, wherein the transfer job further includes: an error notification transmission process that is executed in a case where the transfer job execution history information indicates that an error has occurred in any of the first process or the second process, the error notification transmission process including transmission of a notification indicating the occurrence of the error to a second notification destination associated with the data.

* * * * *